Oct. 6, 1936.   J. Q. FINFROCK ET AL   2,056,315
SELECTIVE DENOMINATION PRINTING AND REGISTERING MACHINE
Filed Feb. 5, 1934   17 Sheets-Sheet 1

Inventors
John Q. Finfrock
Frank P. Sager
By Lyon & Lyon
Attorneys

Oct. 6, 1936.    J. Q. FINFROCK ET AL    2,056,315
SELECTIVE DENOMINATION PRINTING AND REGISTERING MACHINE
Filed Feb. 5, 1934    17 Sheets-Sheet 2
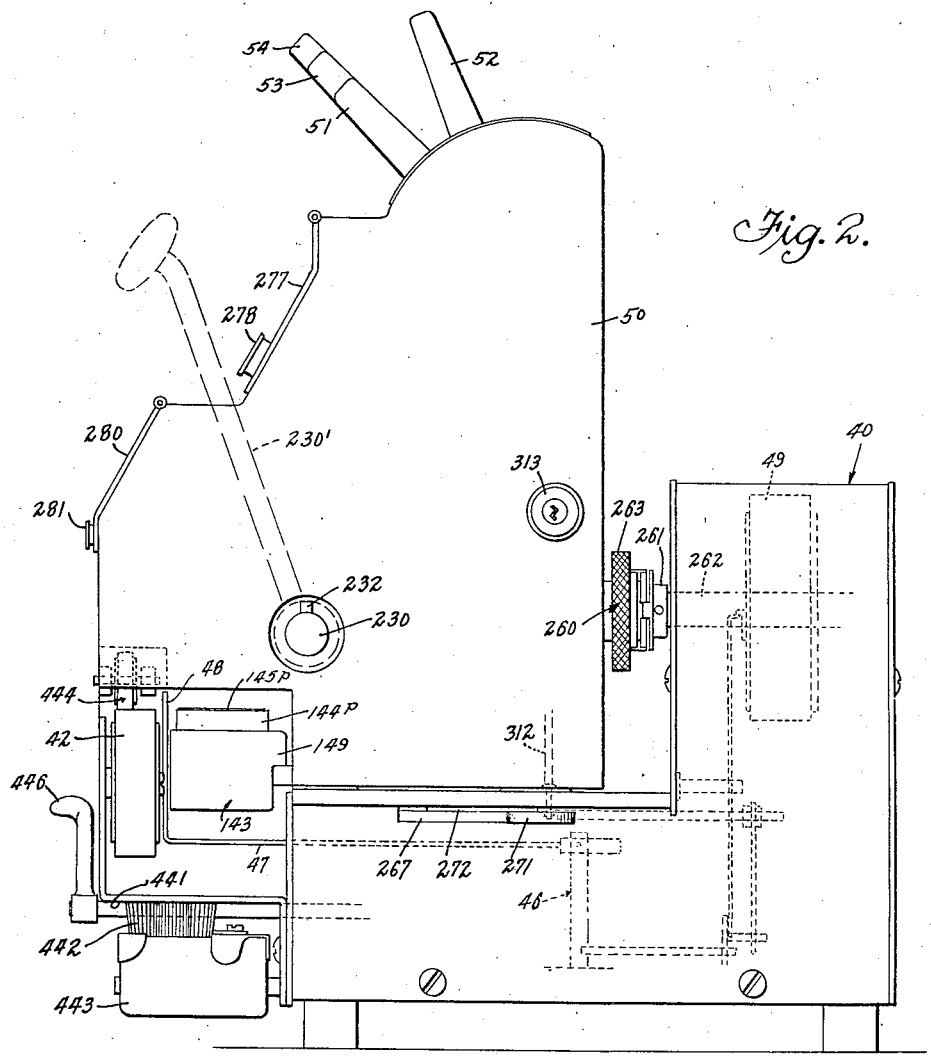

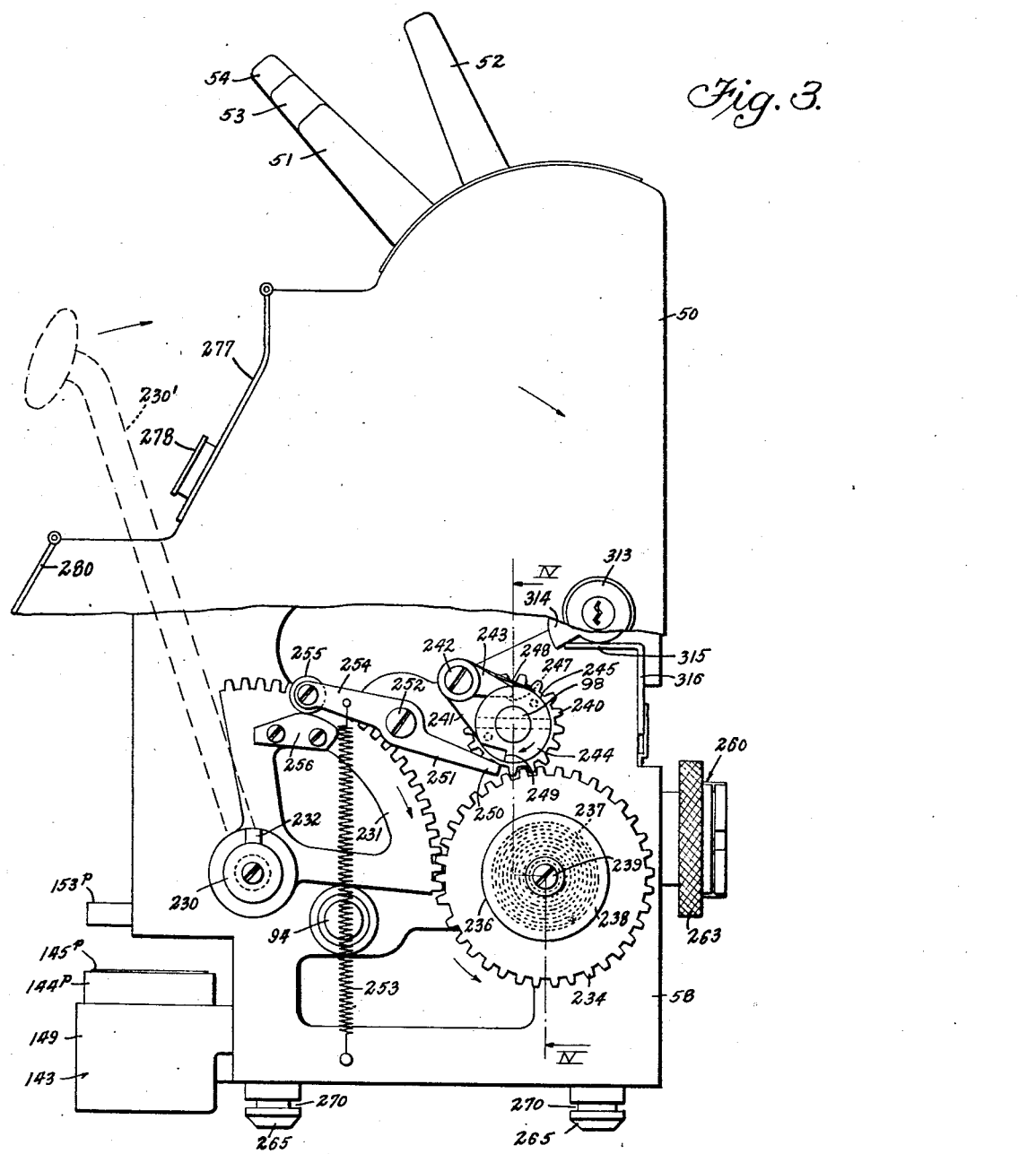

Oct. 6, 1936.    J. Q. FINFROCK ET AL    2,056,315
SELECTIVE DENOMINATION PRINTING AND REGISTERING MACHINE
Filed Feb. 5, 1934    17 Sheets-Sheet 4
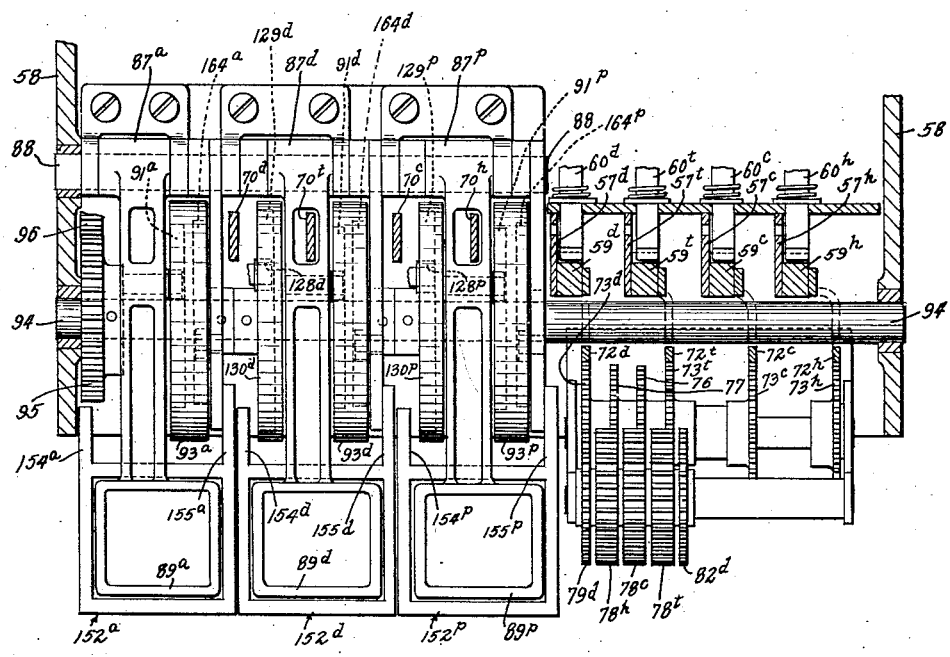
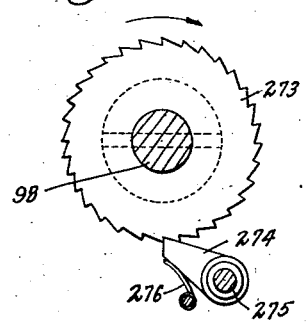
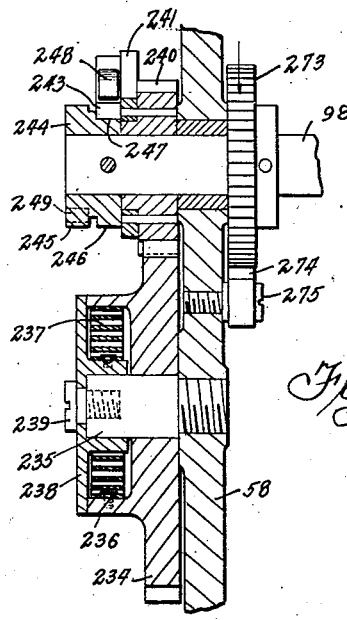
Inventors
John Q. Finfrock
Frank P. Sager
By Lyon & Lyon
Attorneys

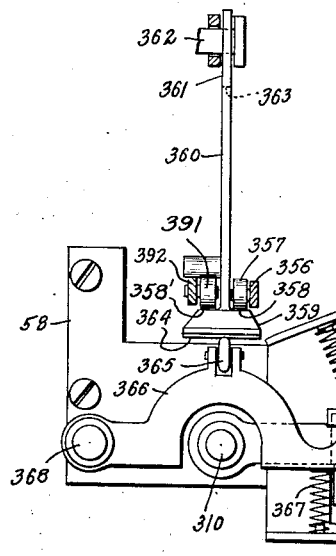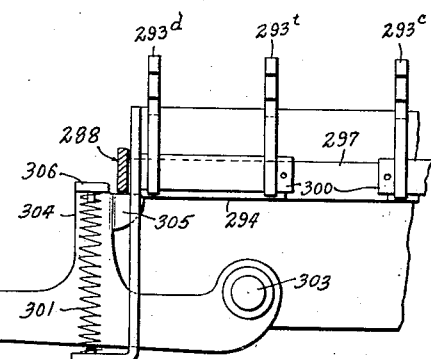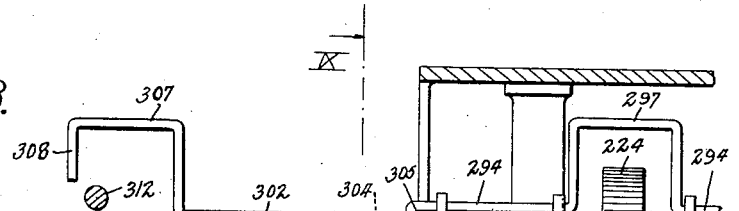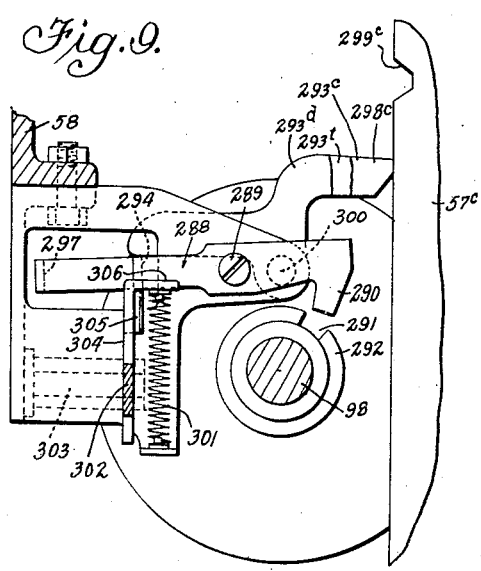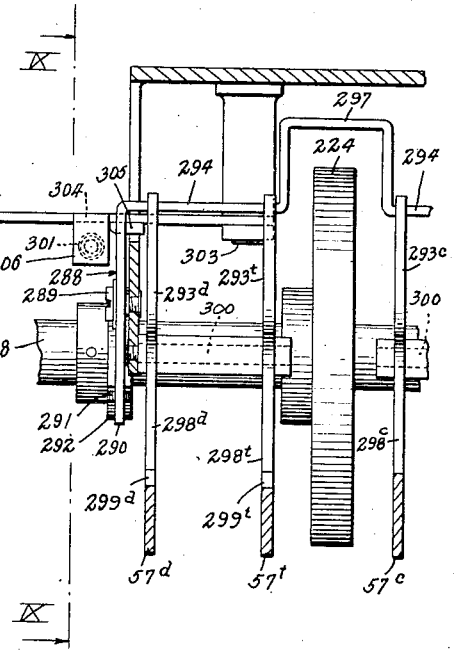

Oct. 6, 1936.     J. Q. FINFROCK ET AL     2,056,315
SELECTIVE DENOMINATION PRINTING AND REGISTERING MACHINE
Filed Feb. 5, 1934     17 Sheets-Sheet 8
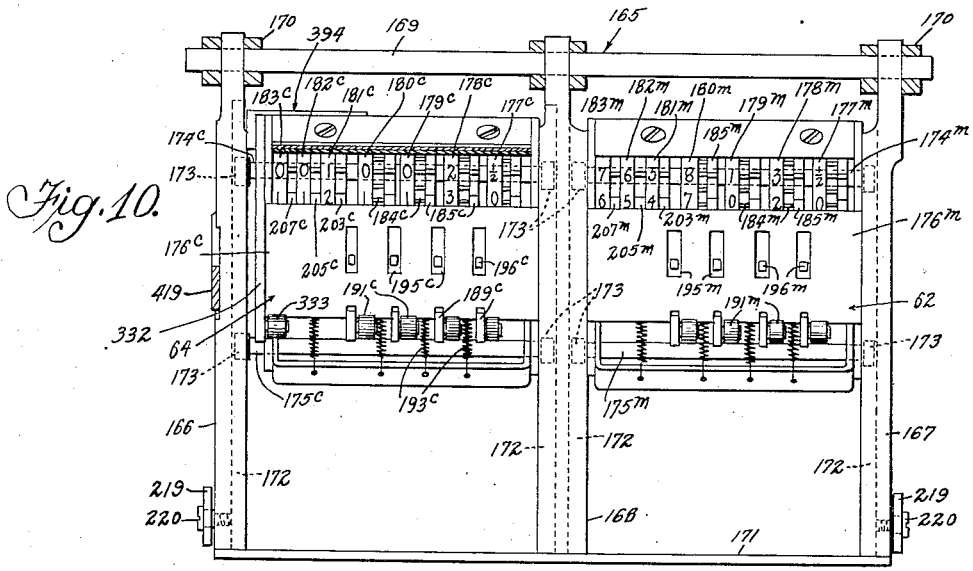
Fig. 10.
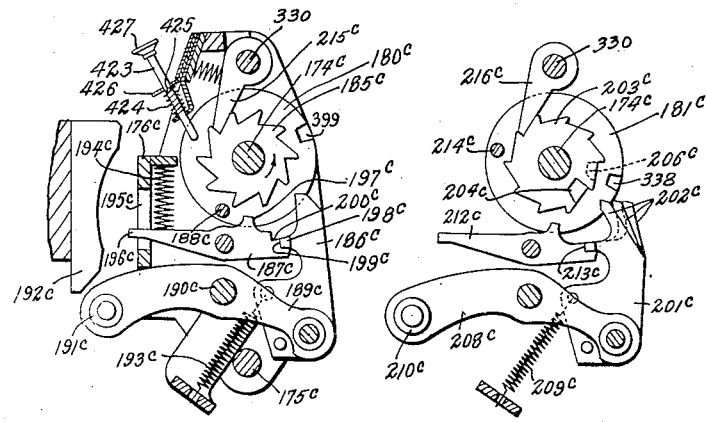
Fig. 12.
Fig. 11.
Inventors
John Q. Finfrock
Frank P. Sager
By Lyon & Lyon
Attorneys Oct. 6, 1936.   J. Q. FINFROCK ET AL   2,056,315
SELECTIVE DENOMINATION PRINTING AND REGISTERING MACHINE
Filed Feb. 5, 1934   17 Sheets-Sheet 9
Fig. 13.
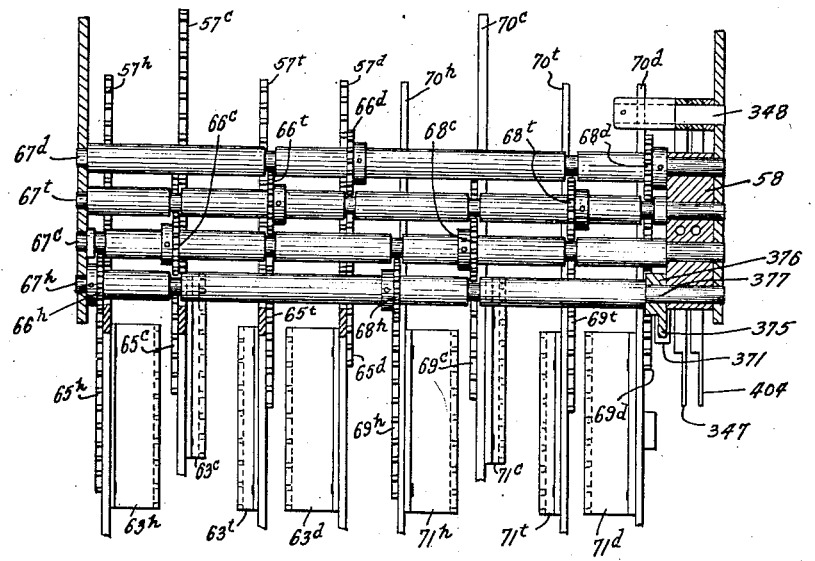
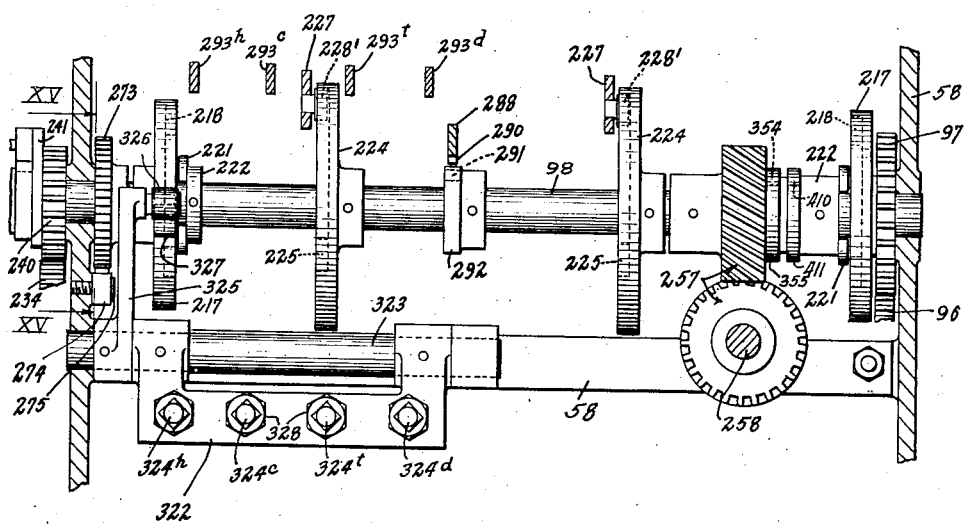
Fig. 14.
Inventors
John Q. Finfrock
Frank P. Sager
By Lyon & Lyon
Attorneys Oct. 6, 1936.  J. Q. FINFROCK ET AL  2,056,315

SELECTIVE DENOMINATION PRINTING AND REGISTERING MACHINE

Filed Feb. 5, 1934  17 Sheets-Sheet 10

Inventors
John Q. Finfrock
Frank P. Sager
By Lyon & Lyon
Attorneys

Oct. 6, 1936.  J. Q. FINFROCK ET AL  2,056,315
SELECTIVE DENOMINATION PRINTING AND REGISTERING MACHINE
Filed Feb. 5, 1934  17 Sheets-Sheet 11
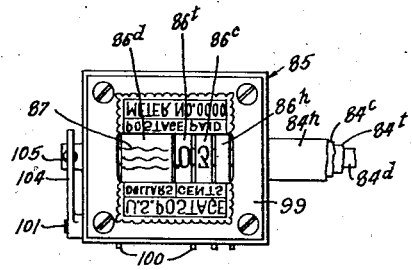
Fig. 21.
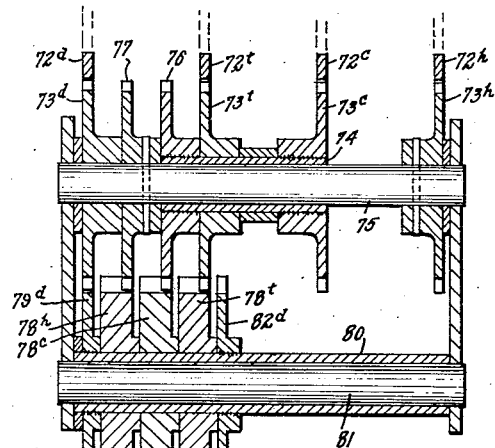
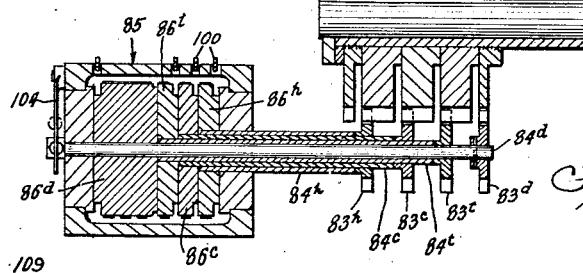
Fig. 20.
Fig. 24.
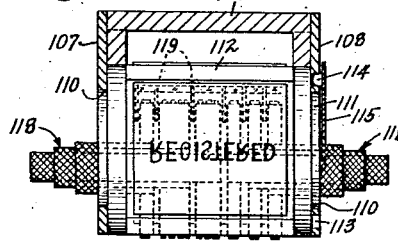
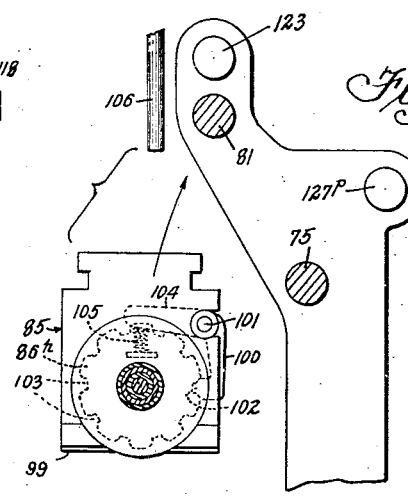
Fig. 22.
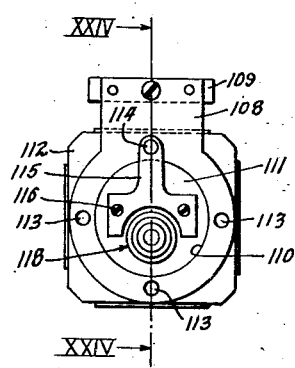
Fig. 23.
Inventors
John Q. Finfrock
Frank P. Sager
By Lyon & Lyon
Attorneys Oct. 6, 1936.  J. Q. FINFROCK ET AL  2,056,315

SELECTIVE DENOMINATION PRINTING AND REGISTERING MACHINE

Filed Feb. 5, 1934   17 Sheets-Sheet 12

Inventors
John Q. Finfrock
Frank P. Sager
By Lyon + Lyon
Attorneys

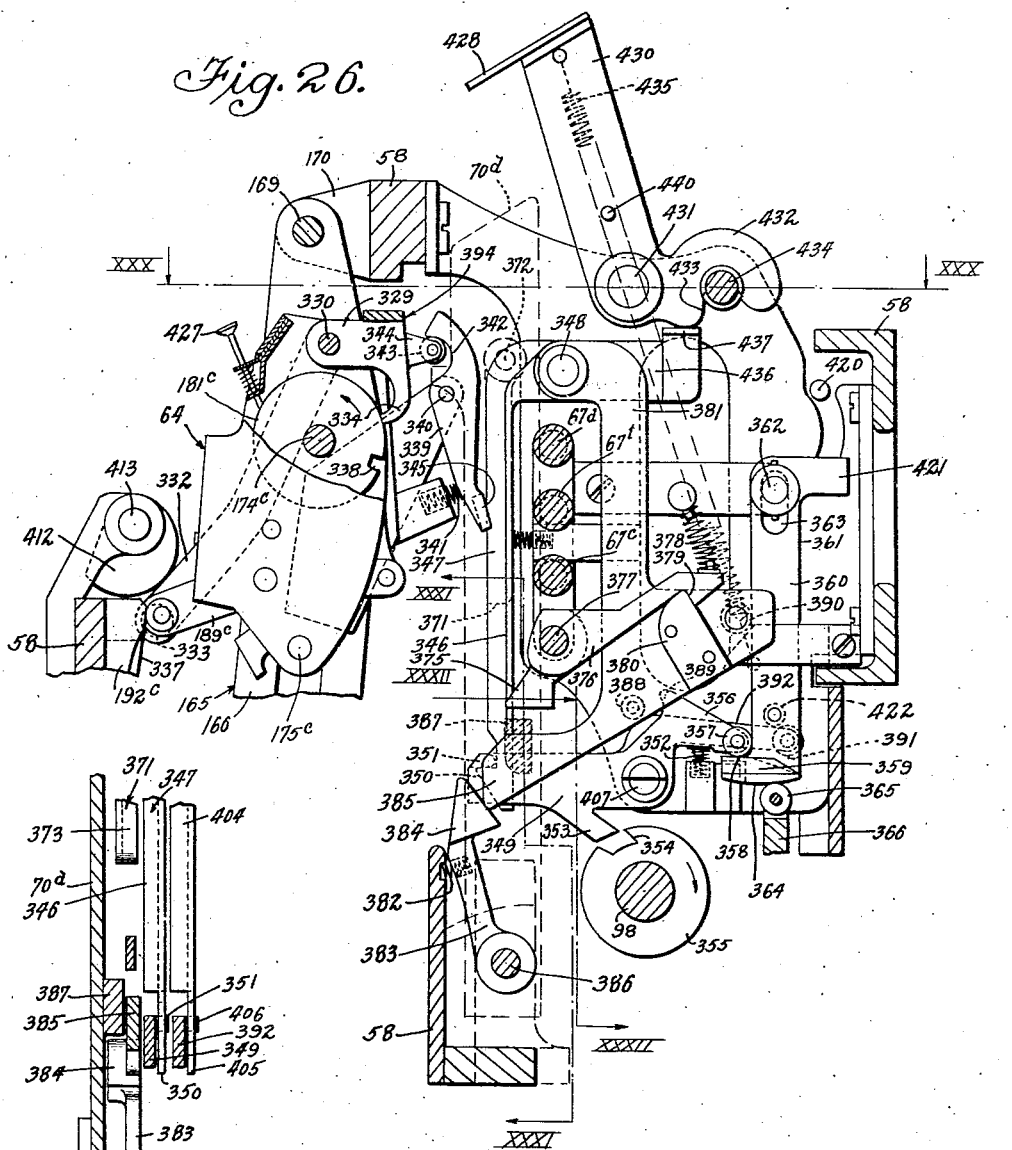

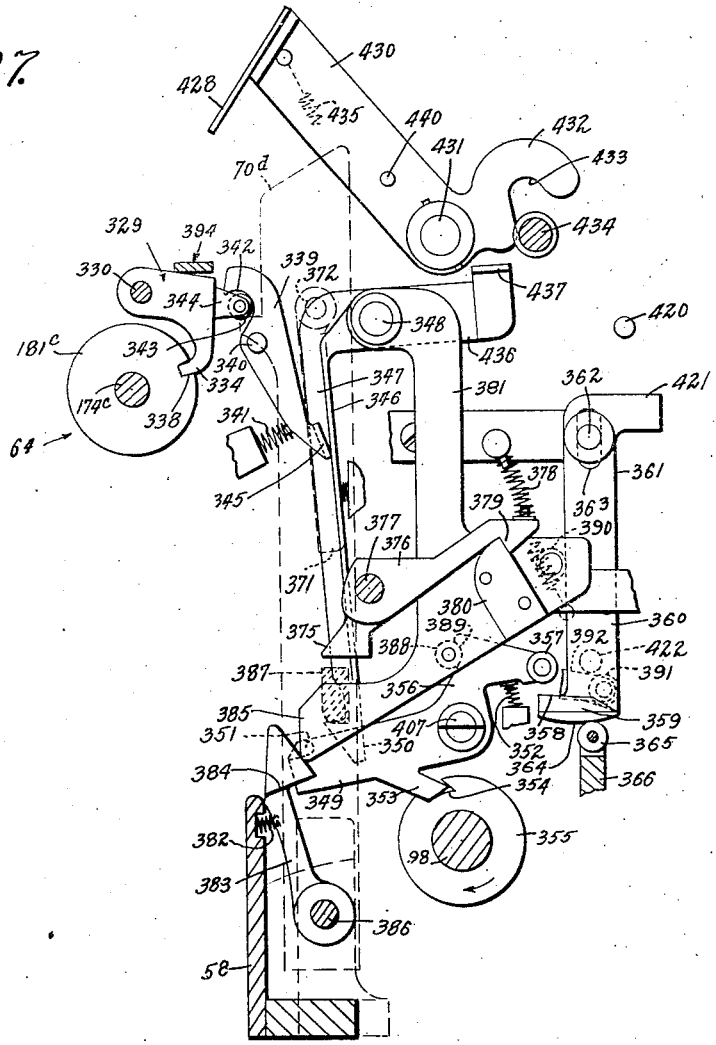

Oct. 6, 1936.  J. Q. FINFROCK ET AL  2,056,315
SELECTIVE DENOMINATION PRINTING AND REGISTERING MACHINE
Filed Feb. 5, 1934  17 Sheets-Sheet 15
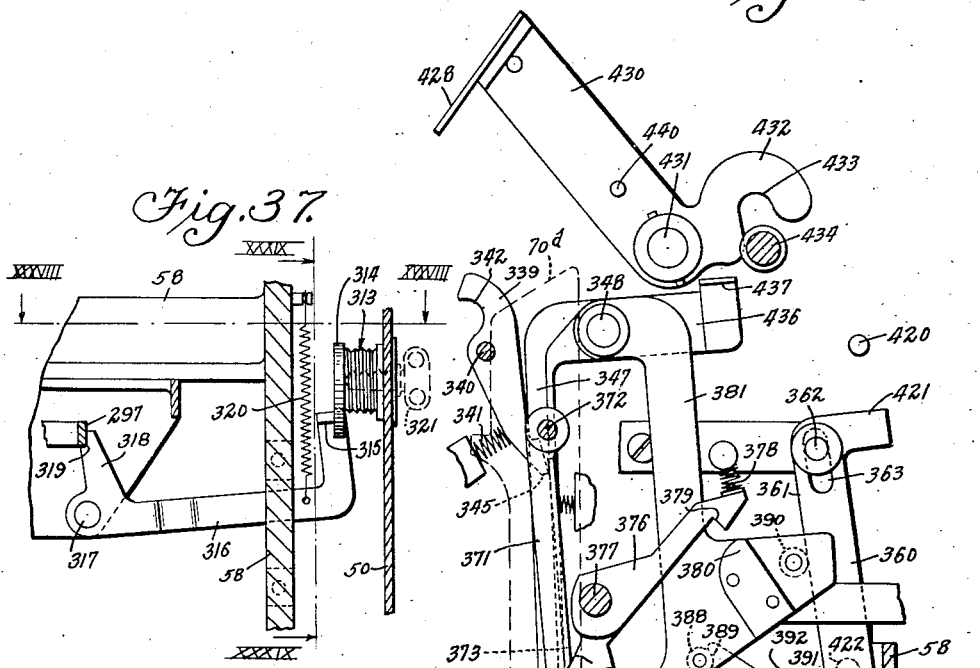
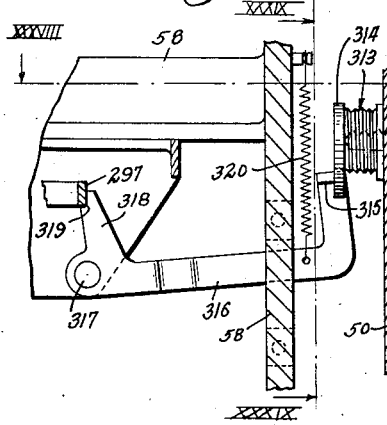
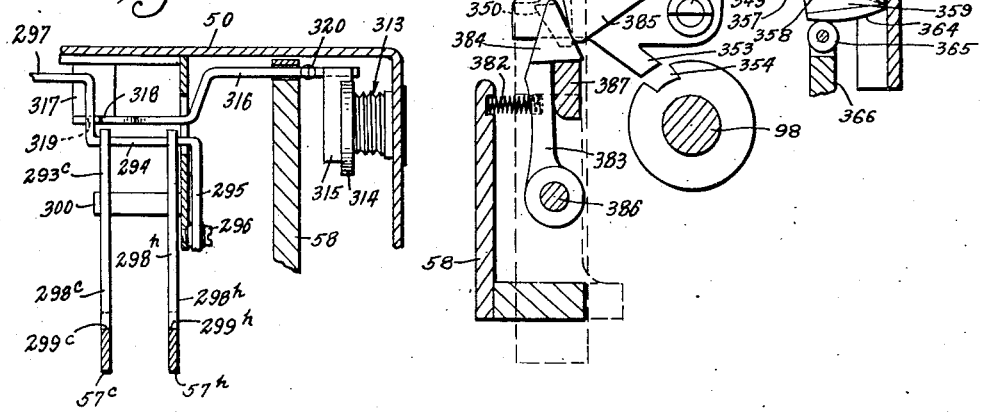
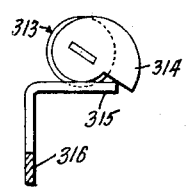
Inventors
John Q. Finfrock
Frank P. Sager
By Lyon & Lyon
Attorneys Oct. 6, 1936.   J. Q. FINFROCK ET AL   2,056,315
SELECTIVE DENOMINATION PRINTING AND REGISTERING MACHINE
Filed Feb. 5, 1934   17 Sheets-Sheet 16

Inventors
John Q. Finfrock
Frank P. Sager
By Lyon & Lyon
Attorneys

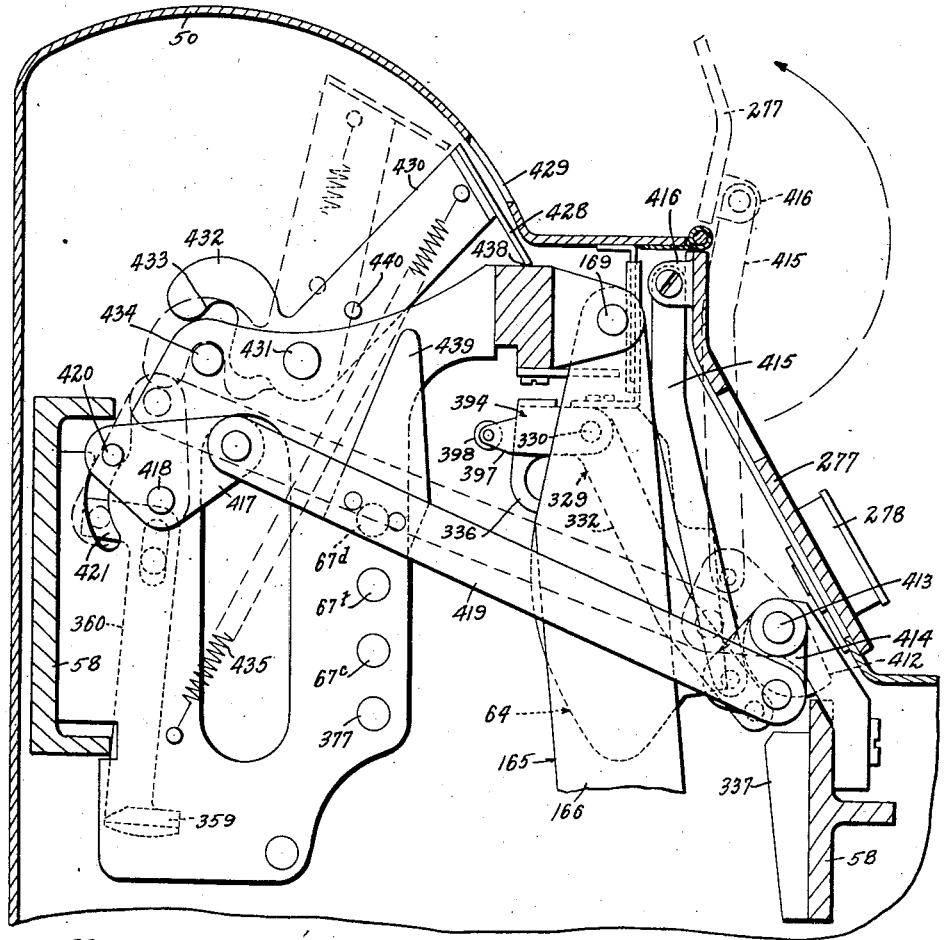
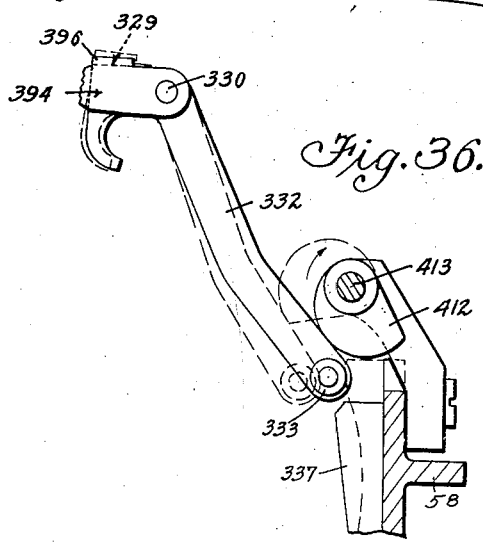
Fig. 35.
Fig. 36.
Inventors
John Q. Finfrock
Frank P. Sager
By Lyon & Lyon
Attorneys Patented Oct. 6, 1936

2,056,315

UNITED STATES PATENT OFFICE 2,056,315

SELECTIVE DENOMINATION PRINTING AND REGISTERING MACHINE

John Q. Finfrock, Los Angeles, and Frank P. Sager, Alhambra, Calif., assignors to National Postal Meter Company, Los Angeles, Calif., a corporation of California Application February 5, 1934, Serial No. 709,796

17 Claims. (Cl. 235—101)

This invention relates to a selective denomination printing and registering machine operable for printing Government postage, revenue or tax stamps, or for printing theater, car or railroad tickets, or other forms, of any denomination within the capacity of the machine, and for registering in terms of money value all such stamps or tickets printed.

The form of the invention especially adapted to the printing of postage stamps will be used herein for the purpose of illustration and description. However, by slight modifications, readily understood by those skilled in this art, the invention may be adapted to a great variety of different uses and purposes.

One of the principal objects of the invention is to provide a machine for printing postage indicia of any denomination within the capacity of the machine directly upon letters or upon a gummed strip of paper, which in turn may be glued upon a parcel post package. The selective range of denominations which may be printed by the machine illustrated herein is from one-half cent to nine dollars and ninety-nine and one-half cents by increments of one-half cents. However, it is to be understood that the machine may be arranged to print higher values by adding more printing wheels and selector lever means, or may be arranged to print lower values as a maximum by leaving off the dollar or dollar and ten cent printing wheels, together with their respective actuating mechanisms. In other words, it is one of the principal objects of this invention to provide a machine which will practically eliminate the need for the usual adhesive postage stamps and which will give an accurate accounting control over the mailing room of firms and post-offices.

A further object is to arrange the machine so that once a selected denomination has been set up for printing and registering the machine may be run until all of the mail requiring the selected denomination will have passed through the machine to receive an imprint of the selected postage indicia. It will be noted that the machine does not require the selector to be actuated to set up the denomination for each piece of mail passing through the machine. On the other hand, however, should several pieces of mail matter each require postage of different denominations, it will be appreciated that the selector may be easily and quickly adjusted to set up the particular denomination required for each piece of such mail matter before printing the indicia thereon.

The invention further provides means whereby for first-class mail, the name and location of the post-office together with the time and date of mailing, may be printed thereon simultaneously with the printing of the postage indicia; for second and third-class mail matter, the name and location of the post-office; while for other classes of mail matter such information as may be required by the post-office department, may be printed simultaneously with the printing of the postage indicia.

The invention further provides means whereby advertising or display matter may be printed simultaneously with the printing of the postage indicia and date circle.

A further object of the invention is to provide a control register which may be locked within the machine casing, to prevent unauthorized tampering therewith, and which register may be rendered accessible for setting or resetting by an authorized post-office official who will be provided with an appropriate key means for opening the casing, and further to provide a control register calibrated in money values whereby the post-office official may set up therein the amount of postage purchased.

A further object is to provide a locking mechanism operatively responsive to the control register, which will function to lock the machine against further use when the amount registered in the register coincides with or falls below the maximum denomination which may be printed. As in this case, the maximum denomination amounts to nine dollars, ninety-nine and one-half cents, it is desirable to provide means for releasing the locking mechanism so that the amount left in the register may be further reduced. However, it is important to simultaneously reduce the printing capacity of the machine to prevent the register from being turned beyond zero and thereby to reset the register to substantially its maximum capacity. The releasing means may be actuated by returning the dollar lever to its zero position, whereat it will be locked to effectively reduce the printing capacity of the machine. As a result of this operation, the maximum denomination which may now be printed, will be ninety-nine and one-half cents, and the machine may be again run until the amount registered in the register coincides with or falls below this reduced capacity, namely, ninety-nine and one-half cents, whereupon the locking mechanism may again be brought into play to finally lock the machine against further use. As the value remaining in the register will be below a dollar, it is deemed sufficiently low to finally lock the machine, and require an additional purchase of postage. It will be understood, of course, that the new purchase of postage will be added to whatever value remains in the register when the machine finally locks. As, for example, if the machine should lock when the register had just ninety-nine cents left in it and the new purchase was for a thousand dollars' worth of postage, then after the register of the guard boxes, together with its actuating cam and the connecting levers. In full lines the device is shown in its retracted position, while in broken lines, in its operative position.

Figure 20 illustrates on enlarged scale, a schematic sectional view taken substantially in the plane of line XX—XX of Fig. 6, sheet 6, to show the operating mechanism for setting the denomination printing wheels by the selector racks.

Figure 21 illustrates a face view of the denomination printing head.

Figure 22 illustrates an end view of the indicia printing head, and especially the means for releasing the locking pawls from the denomination printing wheels.

Figures 23 illustrates an end view of the date circle printing head.

Figure 24 illustrates a sectional view taken substantially in the plane of line XXIV—XXIV of Fig. 23.

Figure 25:
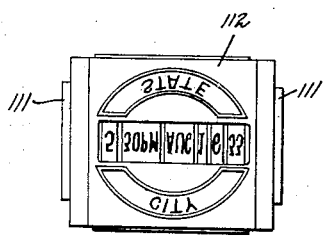

Figure 25, sheet 12, illustrates one of the four faces of the date circle printing head.

Figure 26 illustrates a schematic sectional view to show the locking system as it would appear at the end of the cycle just prior to the value in the subtracting register falling below $10.00.

Figure 27 illustrates a view similar to Fig. 26, but showing the relation of the parts after the value remaining in the register has fallen below $10.00. In this figure it will be noted that the machine is locked against further use until reset by returning the dollar denomination lever to zero.

Figure 28 illustrates a view similar to Figure 27, showing the next step or resetting operation. In this figure the dollar lever has been returned to zero and there latched while the machine is released for further use.

Figure 29:
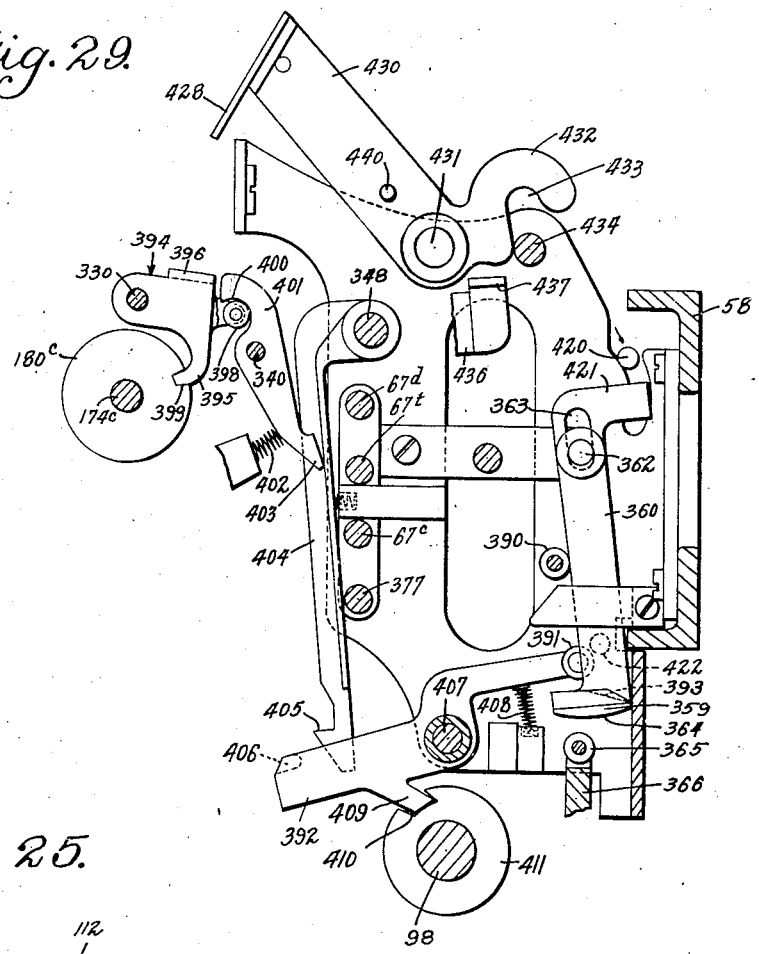

Figure 29 illustrates a view similar to Fig. 28, showing the final step in the progressive locking of the machine. In this figure the value remaining in the register has fallen below $1.00, and the locking pawl has been released to finally and permanently lock the machine against further use until a new value representing postage purchased has been set up in the subtracting register by an authorized post-office official.

Figure 30:
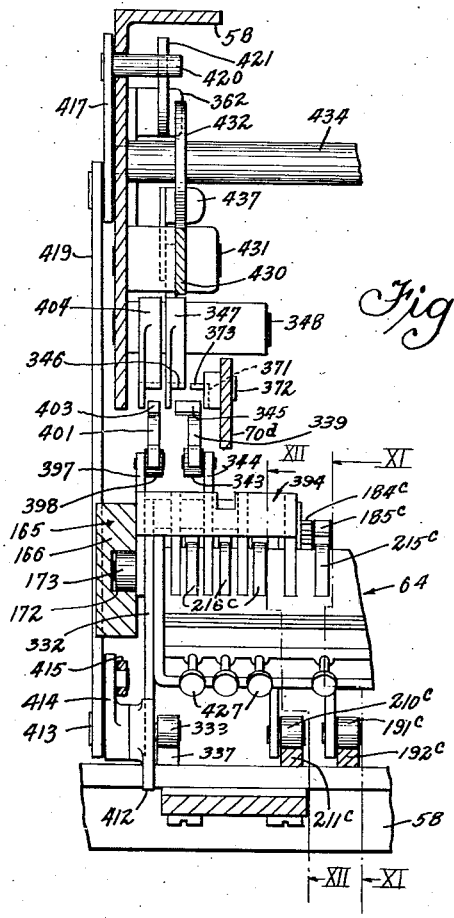

Figure 30 illustrates a fragmental view taken substantially in the plane of line XXX—XXX of Fig. 26, sheet 13.

Figure 31, sheet 13, illustrates a fragmental sectional view taken substantially in the plane of line XXXI—XXXI of Fig. 26.

Figure 32:
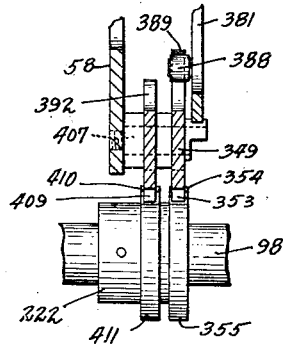

Figure 32, sheet 16, illustrates a fragmental sectional view taken substantially in the plane of line XXXII—XXXII of Fig. 26, sheet 13.

Figures 33, 34:
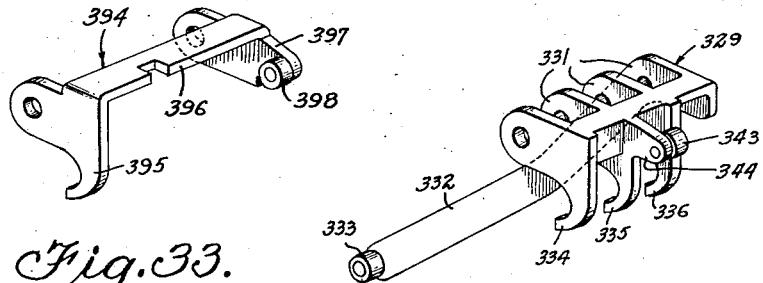

Figure 33 illustrates in perspective, the locking finger or feeler element for the dollar wheel of the subtracting register.

Figure 34 illustrates in perspective, the locking finger or feeler element for the tens, hundreds, and thousands wheels of the subtracting register.

Figure 1:
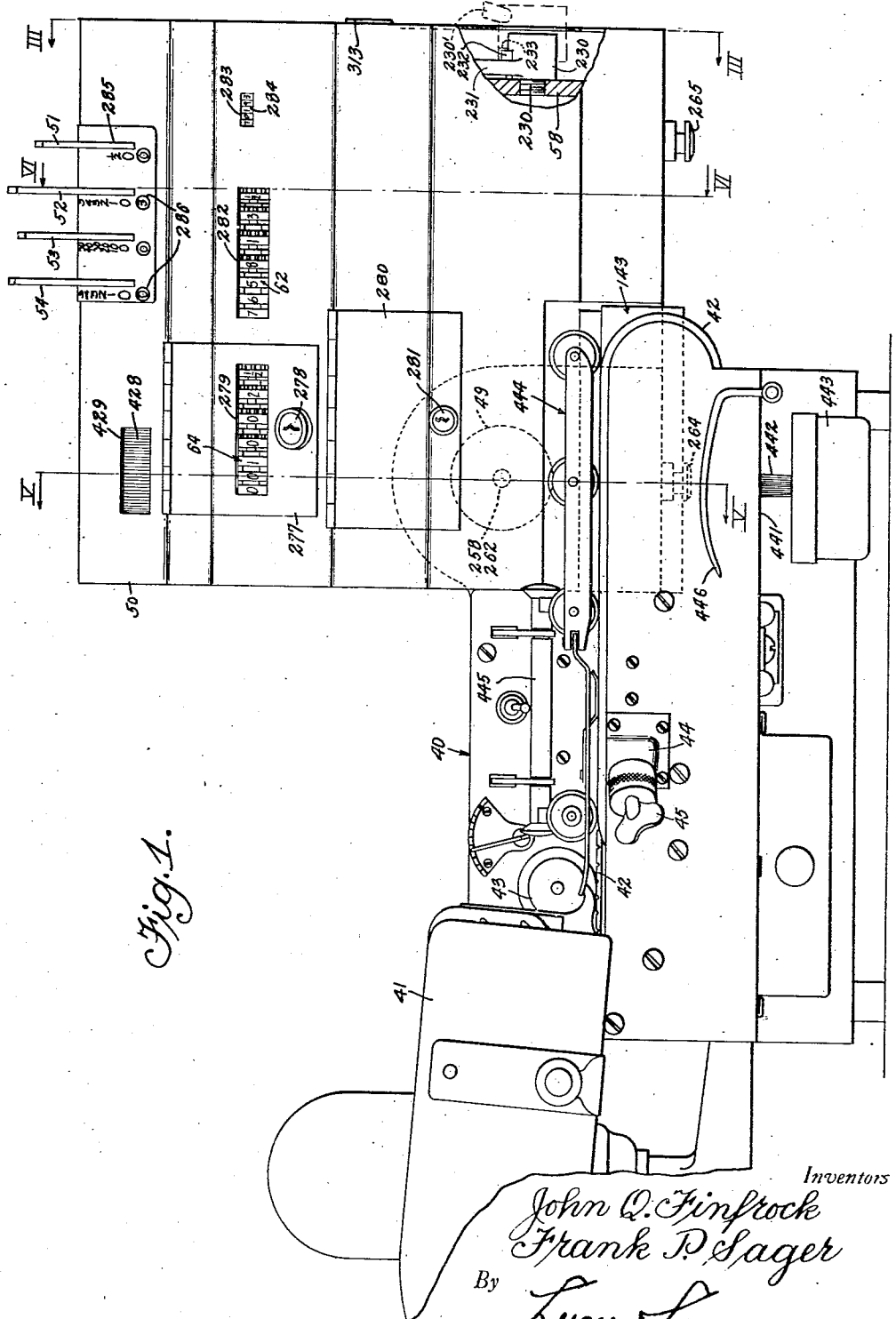

Figure 35 illustrates a fragmental sectional view taken just inside of the casing at the left hand of the machine, as viewed in Fig. 1.

Figure 36 illustrates the cam means for releasing the locking feeler elements from locking engagement with their respective notches formed in the register wheels when the resetting door has been swung open for the purpose of resetting the subtracting or control register.

Figure 37, sheet 15, illustrates a fragmental sectional view of the means for locking the denomination selector, and also the machine against use by unauthorized persons.

Figure 38 illustrates a sectional view taken substantially in the plane of line XXXVIII—XXXVIII of Fig. 37, and Figure 39 illustrates a sectional view taken substantially in the plane of line XXXIX—XXXIX of Fig. 37.

*Specification*

An embodiment of the invention in the form of a postage printing machine, has been chosen for the purpose of illustration and description. This form of the invention is known in the trade as an "omni-denomination postage printing machine," but as this is a long and awkward name, it will, for brevity, be referred to herein as an "omni".

An omni, to be of maximum utility in discharging the many and varied requirements experienced in the mailing departments of different firms, corporations or post offices, should be capable of manual operation to print a selected postage indicia within the capacity of the machine (which, in this instance, ranges from ½ cent to $9.99½ by increments of a ½ cent) directly upon envelopes, or upon gummed strips of paper or tape to be affixed to parcel post packages; the omni should also be capable of being easily and quickly coupled to or uncoupled from a power-driven automatic envelope feeder and sealer, and automatically driven thereby each time an envelope stops at printing station to imprint a selected postage indicia thereon. The power driven automatic envelope feeder and sealer will be referred to herein, as the "power plant" although it is to be understood that this unit may be manually driven.

This omni-power plant combination is admirably adapted to effectively and rapidly handle large quantities of mail matter requiring the same denomination of postage indicia printed thereon. In handling this "speed mail" as it is commonly called, the envelopes may be assembled into piles of similar size and denomination, the requisite denomination set up in the omni for the particular run of mail, a pile of envelopes placed into the receiving hopper of the power plant from which they will be delivered one by one to the printing station, and as each envelope is delivered into printing position, the feed means will stop while the omni is actuated to print the selected denomination thereon, and finally the feed means will again function to eject the printed envelope and to deliver another to the printing station. The above operations all take place automatically, except for the setting of selected denomination and the placing of the pile of envelopes in the power plant hopper and without requiring further attention on the part of the attendant. After all of the mail of one denomination has been run, the mail of other denominations may be similarly handled, being careful however, to set up the correct denomination for each group of mail placed in the machine hopper.

After the speed mail has been disposed of, there may be left an assortment of mail matter requiring a wide range of denominations, and as for each denomination there may be only one or at best a few pieces of this "overweight mail," as it is called, it has been found more convenient to hand-feed this matter into printing position and to manually actuate the trip mechanism to cause the power plant to drive the omni through an operating cycle to print the selected denomination upon the positioned piece of mail matter. To permit the overweight mail to be hand-fed and the power plant hand-tripped, the power plant should be arranged so that the letter feed mechanism may be rendered inoperative, and the hand-tripping mechanism operable for causing the power plant clutch to be thrown into driving engagement for actuating the omni. This same adjustment of the power plant may be made use of when printing adhesive paper strips or tape for use on parcel post packages.

From the above, it will be appreciated that the omni, and omni-power plant combination will nicely fulfill the many and varied requirements experienced in the mailing departments of different firms, corporations or post-offices.

*Omni-power plant combination*

This omni-power plant combination is illustrated in Figures 1, 2 and 3.

The power plant 40 may be of any preferred type, but preferably of that type which is disclosed more or less fully in the following United States Letters Patent, namely: No. 1,809,264 issued to Wilbur C. Allen, June 9, 1931; No. 1,811,028 issued to Commodore D. Ryan, June 23, 1931; No. 1,877,694 issued to Commodore D. Ryan, Sept. 13, 1932; No. 1,879,964 issued to Ralph G. Whitlock, Sept. 27, 1932; No. 1,894,427 issued to Commodore D. Ryan, Jan. 17, 1933; No. 1,927,806 issued to Commodore D. Ryan, Sept. 19, 1933, and No. 1,930,943 issued to Commodore D. Ryan, Oct. 17, 1933.

As the power plant is more or less fully disclosed in the above patents, and by itself does not form a part of this invention, it will not be described in detail. The elements of the power plant which directly cooperate with the omni will, however, be pointed out.

As previously stated, the principal advantages derived by combining the omni with the power plant, results in the dispatching of the speed mail more expeditiously, and for power driving the omni when imprinting overweight mail or parcel post stickers.

For handling the speed mail, the power plant may be provided with a hopper 41, a conveyor system 42, and a stripper 43, by means of which the segregated mail matter placed in the hopper may be automatically fed therefrom to the omni printing station, one piece at a time.

A sealing means indicated at 44 may be positioned to moisten the gummed under-surface of the envelopes as they are carried along by the conveyor from the hopper to the printing station. By means of handle 45 the sealer may be moved out the path of the envelope flaps so as not to interfere with the passage of envelopes which have been previously sealed.

Figure 5:
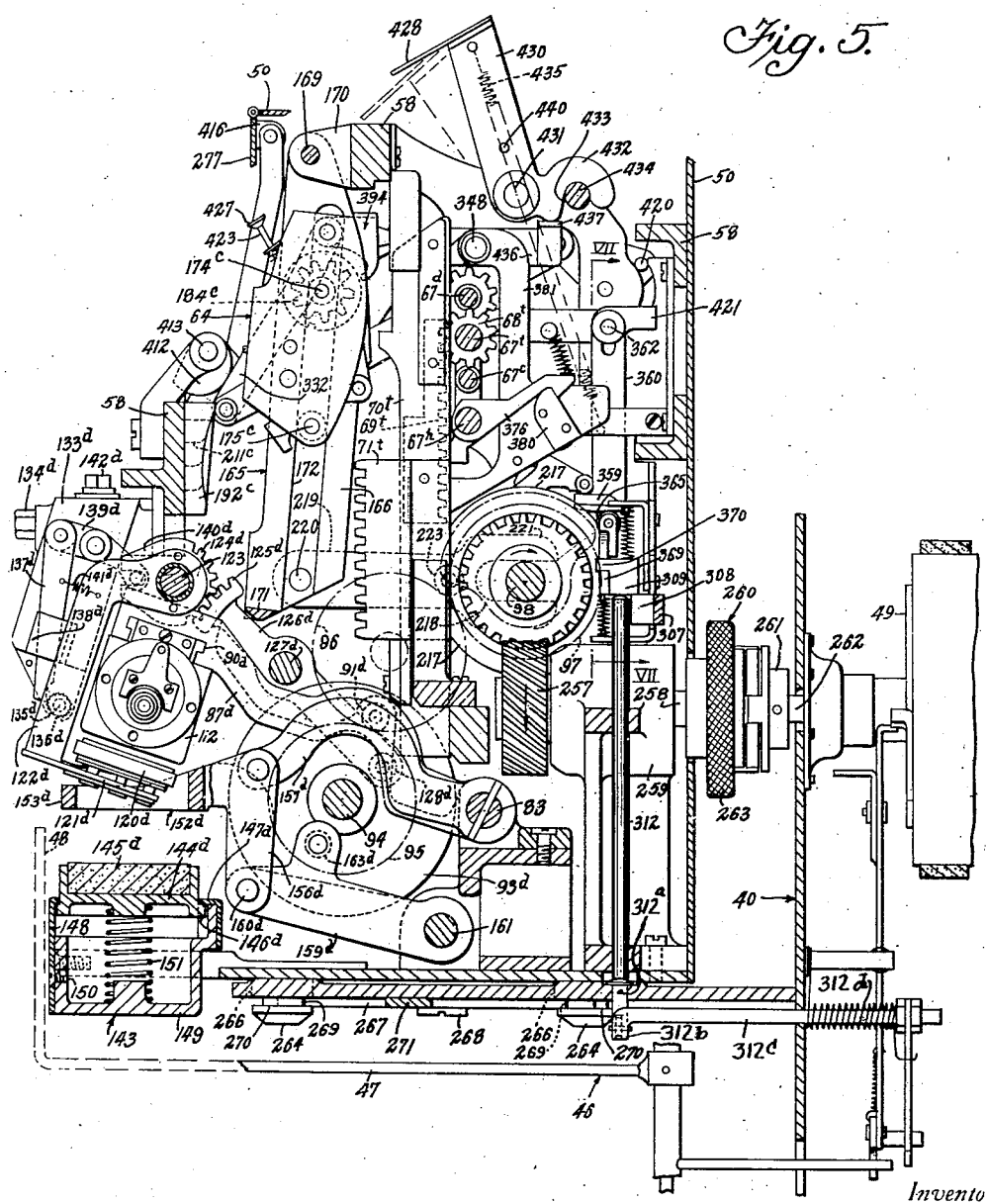

As may be observed most clearly in Figures 2 and 5, a driving clutch tripping mechanism 46 may be provided with a tripping arm 47 having its free end bent upwardly as at 48 to intercept the path of travel of the envelopes, whereby as each envelope is conveyed into the printing station, it will engage the end 48 of the tripping arm and thereby throw clutch 49 into active engagement for driving the omni through one complete operating cycle.

The clutch 49 may be of the single cycle or one revolution type, that is, each time the clutch is tripped, it will turn through a single revolution and then become automatically disengaged and ready to be again tripped into driving engagement when the next envelope actuates the tripping mechanism.

Each time the driving clutch is thrown into driving engagement, the driving means for conveyor 42 is automatically disengaged, whereupon the envelope delivered into the omni printing station is stopped during the printing operation. Upon the completion of the printing operation, the clutch 49 will be automatically disengaged, while the conveyor driving means will again be brought into action to eject the printed envelope from the printing station while the next succeeding envelope will be conveyed into the printing station, and this cycle of operation will automatically continue as long as envelopes are supplied to the hopper.

The specific details of the power plant elements including those thus far described, are fully disclosed in the patents previously mentioned, and therefore, will not be repeated.

In operating the omni-power plant combination, the attendant may segregate all mail matter requiring the same denomination of postage printed thereon, set the power plant into operation, adjust the hopper to suit the size of matter to be run, set the omni to the denomination required for the particular lot of mail matter to be passed through the machine, and then all the attendant need do is to place the selected mail in the hopper until this particular lot of mail has all passed through the machine.

If, for example, the postage required on the first run of mail was three cents, and on the second run six cents, then after the first lot had been run, the attendant need only set the omni for six cents and place the six-cent mail matter in the hopper until it had all passed through the machine, then set the omni for the next denomination to be run, and so on until all of the speed mail had been taken care of. The operation of the machine is very rapid, and as a result thereof, a large quantity of this speed mail may be taken care of by a single machine.

*Omni*

The omni may be sealed and locked within a casing 50 through which may project the selector levers 51, 52, 53 and 54, and adjacent each lever the casing may be appropriately calibrated. The selector lever 51 may be referred to as the one-half cent lever, and may be actuated to the zero position or the one-half cent position as indicated upon the casing. The cent selector lever 52 may be actuated to a position opposite any one of its adjacent numbers 0 to 9, while the ten cent lever 53 may be positioned opposite any one of its adjacent series of numbers of from 0 to 90, and finally the dollar lever 54 may be positioned opposite any one of its adjacent numbers of 0 to 9. Each of the selector levers may be actuated independently of the other levers in order that a range of values from ½ cent to $9.99½ by increments of a ½ cent may be set up in the machine. This range of values which may be set up, will be referred to as the printing and/or registering capacity of the machine. It will be understood, however, that the omni may be provided with a greater number of selector levers to thereby increase the printing range or capacity thereof, and likewise, a less number of selector levers may be provided to correspondingly reduce its printing capacity. In Figures 1, 2, 3 and 6, the cent lever 52 is illustrated as positioned opposite the 3-cent mark formed on the casing. With the cent lever in this position, the omni will be set to print a 3-cent postage indicia upon each envelope presented to the printing station, and to register this amount in a control register.

Selector mechanism

The selector mechanism includes the four selector levers and a separate but similar actuating mechanism cooperating with each for setting up a selected denomination in the printer head and for setting one or more of the selector racks for actuating the control register to register therein the value of each imprint made by the printer head.

As each of the selector mechanisms is similar, the description of one will suffice for all. It will be appreciated that the ½-cent selector mechanism is similar to the other selectors, but differs therefrom primarily in its range of action.

The cent selector mechanism is most clearly and fully illustrated, and therefore will be used for the purpose of description. For convenience in referring to the corresponding parts of the several selector mechanisms, these parts will carry the same numbers, but will have different letters added thereto as, for example, all of the numbers of the ½-cent selector mechanism will carry the letter "h"; the cent selector mechanism the letter "C"; the ten-cent selector mechanism the letter "t" and the dollar selector mechanism the letter "d".

Figure 6:
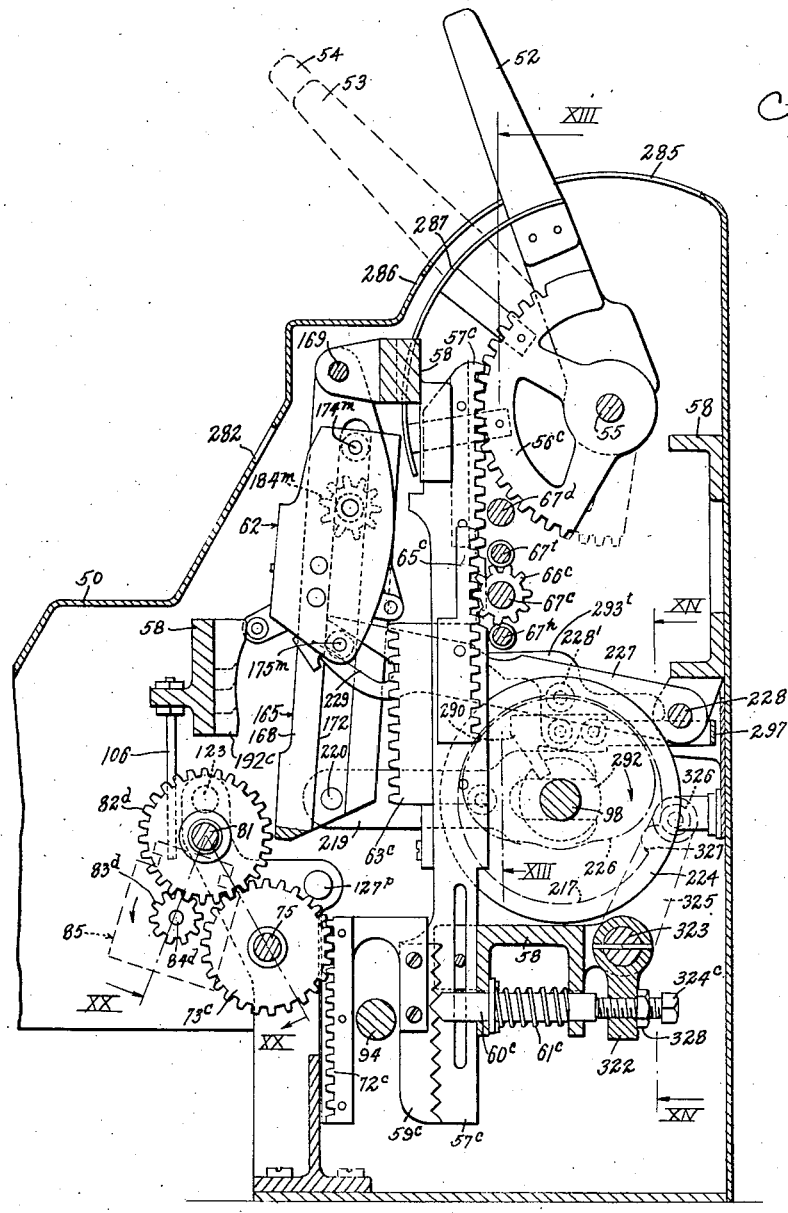

Referring first to Figure 6, it may be observed therein that each of the selector levers above referred to, is journaled upon a transverse shaft 55 in such a way as to permit each lever to be swung independently of the other selector levers. This view, which has been taken between the one-half and one cent levers, shows the one cent lever in its three cent position, that is, in position to set up for printing the numeral "3" in the printer head, and to actuate the control register to register three cents each time the machine operates.

During the setting of the one cent lever 52 from zero to its three cent position, the sectoral gear 56c carried thereby, will act to lift the selector rack 57c with which it meshes. The selector rack may be slidably mounted upon the frame 58 of the machine in any preferred manner. A positioning rack 59c may be carried by the lower end of the selector rack, and may be engaged by a detent 60c slidably mounted in the machine frame and yieldingly urged into engagement with the rack by the spring means 61c. This positioning means insures that the selector lever will be stopped at the correct location for each value to which it may be actuated. The selector rack 57c may also be provided with a third rack located upon the front face and intermediate the ends thereof. This third rack is provided to actuate the adding counter or register 62, and will be referred to as the adding register rack 63c. A control register 64 may be arranged to one side of the adding register as may be observed in Figs. 1 and 10. It is important to also actuate the control register to register therein the value of each impression printed by the machine, and for this purpose the selector rack may be provided with a fourth rack 65c, which may be located just above the center and intermediate the ends thereof. In mesh with this fourth rack 65c is the driven pinion 66c fixed to the transverse shaft 67c (Figs. 6 and 13). Also fixed to shaft 67c is the driving pinion 68c, which pinion is in mesh with the fifth rack 69c. This fifth rack is carried by the control register actuating rack bar 70c slidably mounted in the machine frame. The rack bar 70c is also provided with a control register driving rack 71c, similar to the adding register rack 63c. As may be noted in Figure 13, the corresponding control register driving racks may be similar in all respects to those for the adding register, and certain of these racks may be offset to a greater or less extent from the rack bars in order to align the teeth thereof with the related teeth of the register driving pinions.

The four selector rack bars 57h, 57c, 57t and 57d are also provided with means for turning the denomination printing wheels carried by the postage indicia printing head, (note Figures 6, 20, 21 and 22). As the means for each of these bars is similar, the plan of describing these means for the cent lever will be continued, but it will be pointed out wherein certain of these means differ.

The selector rack bar 57c may be provided at its lower end with a forwardly directed denomination printing wheel driving rack 72c, (Fig. 6 and 20) and maintained constantly in mesh with gear 73c. At this point it may be noted in Fig. 20, that the gear 73c may be fixed to one end of a sleeve 74 journaled upon the shaft 75, and at the other end of this sleeve may be fixed a similar gear 76, while the gear 73h is keyed directly to shaft 75 to drive the gear 77 also keyed thereto, that the gear 73t is journaled upon sleeve 74 and finally the gear 73d is journaled directly upon shaft 75. Gears 77, 76 and 73t are in constant mesh with wide faced gears 78h, 78c and 78t, while the gear 73d meshes with the narrow gear 79d fixed to the sleeve 80, which sleeve may be journaled upon the shaft 81. A gear 82d is also fixed to the sleeve 80 and between gears 79d and 82d the gears 78h, 78c and 78t may be freely journaled upon sleeve 80. A printer wheel pinion 83c carried upon the outer end of sleeve 84c, meshes with the gear 78c when the postage indicia printing head 85 is in its retracted position, as illustrated in Figs. 6 and 20. The cent printing type wheel 86c is fixed to the inner end of sleeve 84c within the printer head, and is provided around its periphery with denomination printing type ranging in value from zero to nine. It will be noted in Fig. 20 that sleeves 84h, 84c, 84t and 84d are nested, one within the other and that sleeve 84d need not be hollow, and also that the denomination printing wheel 86d is wider than the other wheels, in order to carry a dollar sign in front of each figure, and to provide at the zero sector of the wheel a plurality of wavy type lines 87 as shown in Fig. 21, for printing these lines when printing values below a dollar to prevent numerals representing one or more dollars, from being afterwards fraudulently printed in the indicia.

It will be appreciated, of course, that the half cent, ten cent and dollar selector and printing means may be eliminated, leaving only the cent selecting and printing devices when it is desired to provide a simple machine having a limited range of printing values, namely, from one cent to nine cents by increments of one cent.

Printing means

In the embodiment of the invention illustrated, there are three separate printer heads: the first, for printing the postage indicia with a selected denomination; second, for printing the date circle as required; and third, for printing advertising matter or a return address on the mail passing through the machine.

Each of these printer heads is removably mounted upon one of three independent swing levers which are actuated to carry their respective printer heads to and from printing position. The swing levers together with their operating mechanism, are all of substantially the same construction, and therefore, it is deemed sufficient to describe only the swing arm and actuating mechanism for the postage indicia printer head. In order that the corresponding parts of the two other mechanisms may be easily located in the drawings, the same numbers will be used with "p" "d" or "a" added thereto, to designate whether the particular part is related to the postage, date circle or advertising printers.

Figure 18:
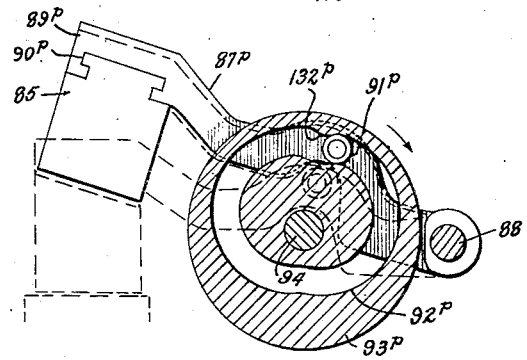
Figure 18 illustrates a sectional view of one of the printing heads and actuating cam therefor. The head is illustrated in full lines in its retracted position, while in broken lines in printing position.

Referring to Figs. 5, 16 and 18, the postage indicia swing lever or arm 87p may be pivotally connected at its inner end to the machine frame as at 88, while its free end may be provided with a head 89p through which may be formed the T slot 90p. A cam roller 91p (Fig. 18) may be journaled upon the side and intermediate the ends of the swing arm and arranged to travel in the cam groove 92p formed in the adjacent side face of the cam wheel 93p. The cam wheel may be fixed to and rotated by the drive shaft 94 and driven by the spur gear 95 (Fig. 16) through the train of gears 96 and 97, all indicated by broken lines in Fig. 5. Gear 97 of this train may be fixed to the main drive shaft 98. In Fig. 18 the eccentric contour of cam groove 92p may be clearly seen, whereby as the cam wheel 93p rotates the cam roller 91p will be moved up and down, and thereby the swing arm will be swung to move the printer head carried thereby to and from the printing position.

The postage indicia printing head 85 may be in the form of a rectangular box having formed upon its upper surface a T head of such size as to nicely fit into the T slot 90p, formed in the swing arm head (Figs. 18, 21 and 22). Within this head are operatively mounted the denomination printing wheels previously referred to. The under surface of the head may be provided with an indicia printing type plate 99 (Fig. 22) bearing any appropriate style or form of characters, one form of which is illustrated in Fig. 21.

From the above description it will be appreciated that the printer head 85 swings back and forth during the operating cycle of the machine, and therefore, as the denomination setting pinions 83h, 83c, 83t and 83d are carried by this head, they are likewise swung back and forth over this prescribed course and thus out of mesh with the setting gears 78h, 78c, 78t and 82d, during the printing operation, and thereafter back again into mesh. It is desirable, though not absolutely necessary, to provide means for locking the denomination printing wheels against rotation during the time the pinions 83h, 83c, 83t and 83d are out of mesh with their related gears. This feature is desirable for two reasons: first, to prevent the pinions from turning slightly during the swing of the printer head, and thus moving out of meshing relation to their companion gears; and second, to prevent the denomination printing wheels from being tampered with to set up for printing, a higher denomination than will be registered in the control and adding registers, and thus fraudulently obtain more postage than paid for. This locking means for the denomination printing wheels is illustrated clearly in Figures 20, 21 and 22, and includes mounting a pawl 100 for each of the printing wheels upon a pawl shaft 101. It will be understood that each of the pawls is fixed to the shaft so as to be swung thereby to withdraw the hooked and tapered end 102 of each pawl, to or from one of a series of correspondingly shaped notches 103 formed about the periphery of each wheel. The outer end of each pawl and the inner end of each notch should have a substantially parallel portion to act as a bolt to positively lock the wheels against any reasonable force applied to the wheels in an attempt to rotate the same, while the mouth of each notch should be tapered to facilitate the entrance of the pawl therein, and the pawl may be likewise tapered. This latter arrangement will insure that each wheel will be maintained in correct alignment, and should one or more of the wheels be slightly out of alignment as the pawls enter the notches, the pawls will act to turn the out-of-line wheels and maintain them in correct alignment. The shaft 101 may extend beyond one end of the printer head, and have an arm 104 fixed thereto. As may be noted from Fig. 22, a spring 105 may be provided to yieldingly urge arm 104 in a clockwise direction, as viewed in Fig. 22, to in turn urge the pawls into their respective notches. A plunger carried by the machine frame may have an end 106 positioned to engage the arm 104 just prior to the arrival of the printer head at its initial starting position to rotate the arm against the tension of spring 105, and thus turn shaft 101 to swing the pawls free from their notches. This action takes place just as pinions 83h, 83c, 83t and 83d mesh with their related gears.

Date circle printer head

The date circle printer head, as illustrated in Figs. 23, 24 and 25, may include a pair of end flanges 107 and 108 securely retained in spaced relation by the cross member 109; and as may be noted in Fig. 23, the member 109 may project beyond each side of the reduced portion of the end flanges to thus provide an effective T head to nicely fit the T slot 90d of the date circle swing arm. Each end flange may be bored as at 110, to act as a supporting bearing for the cylindrical bearing bosses 111 formed at each end of the turret head 112, and further, the end flange 108 may be provided with four equally spaced locking holes 113 into the selected one of which the pin 114 may be yieldingly retained by the spring 115. It will be understood, of course, that the pin 114 may be formed by denting the spring at the proper location, or a pin piece may be suitably fastened thereto, and that the spring member may be fastened to the end of the turret head by means of screws 116.

The turret head 112 may be provided with four printing faces, any one of which may be brought into printing position by springing the pin 114 clear of the locating hole, and then rotating the turret until the desired face is in printing position, whereupon the pin will again enter one of the locating holes to lock the head in its new selected position.

Each of the four printing faces of the turret head may be provided with a type plate of a different style as, for example, on one face the type or die may bear merely the word "registered" for use when running mail which is to be registered; another face may have a die for second and third class mail, arranged to print a circle together with the name and location of the post-office; while the third face may be for first-class mail and may have a die to print the date circle around which the name and the location of the post-office may be printed, and date and time type wheels projecting through the center portion of the circle for printing the date and time of mailing. This face of the turret is illustrated in Fig. 25.

The date and time printing wheels may be more or less of the usual form, and mounted within the turret head eccentric to the center of rotation thereof, so that the printing faces of these wheels will project through only the face of the turret carrying the die for the first-class mail matter. There are six wheels in all, and by means of the two sets of nested shafts 118, one set of which projects from each end of the turret, each set may include three sleeves. Each of the six sleeves is connected to a single wheel (Fig. 24) and thus the wheels may be individually set to print the correct date and time of mailing. The extreme ends of the sleeves may be knurled for convenience in turning. The wheel carrying the 30 P. M. may also be provided with 30 A. M. type, as well as just plain P. M. and A. M. type, and if desired, other fractions of the hour may be provided for both A. M. and P. M.

Spring pawls 119, as indicated in broken lines in Fig. 24, may be provided to yieldingly hold the several date and time wheels in their set positions, but will yield readily to permit the turning of the wheels to change the date or time.

The advertising printer head may be similar in construction to the date circle printer head, excepting the time and date setting wheels may be dispensed with and the four faces provided of different advertising matter, any one of which may be selected for printing upon a particular run of mail. When no advertising matter is to be printed, the entire printer head may be removed from the machine.

Inking means

Figure 19:
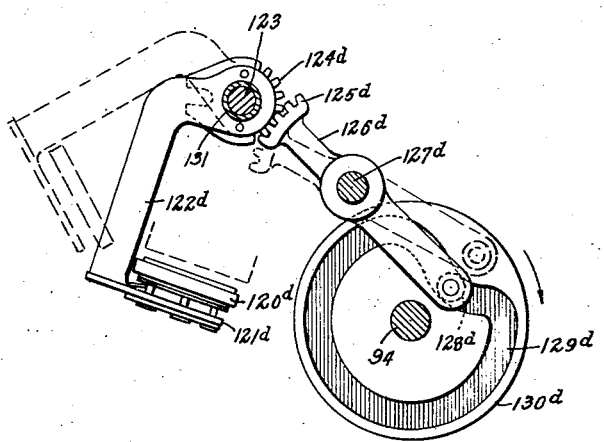
Figure 19 illustrates a sectional view of one of the inking devices, actuating cam and connecting mechanism, and in full lines these parts are shown in their normal inking position, while in broken lines in their retracted position.

In Figures 5 and 19, there is illustrated a means for inking each of the printer heads, and as all three of these devices are alike, one will be described in detail. As in Fig. 5, the inker for the date circle printer head is shown. This one has been selected for the purpose of description. Following the previous plan, the letter "p", "d" or "a" will be added to the numerals for indicating whether the inker parts are for the postage, date circle or advertising printer heads.

Referring to Figures 5 and 19, an ink pad 120d of conventional design, may be spring mounted upon a platform 121d carried by a pair of spaced arms 122d, which arms may be journaled on the transverse shaft 123. To one of the arms 122d there may be fastened a sectoral gear 124d which meshes with, and is driven by the gear sector 125d formed upon the upper end of the lever 126d. The lever 126d may be pivotally supported intermediate its ends as at 127d, and at its lower end may carry an offset cam roller 128d which travels in the cam groove 129d formed in the side of the cam wheel 130d fixed to shaft 94. It will be remembered shaft 94 is the same shaft to which the printer head actuating cam wheels are mounted, and thus the printing and inking means may be actuated in timed relation.

Of course, it will be understood that all three of the inkers may be actuated from a single cam and lever, by fixing the arm 122d which is chosen to be driven, as well as all of the other arms to the shaft 123, whereby the oscillation of the shaft will act to swing all of the arms simultaneously. In fact, the advertising inker in this embodiment of the invention is actuated from the date circle mechanism, by providing a sleeve 131 journaled upon shaft 123, and by fixing the arms 122d thereto. The sleeve is rotated by providing one of the arms 122d with the sectoral gear 124d, which is driven by the gear sector 125d carried by the lever 126d, which lever is actuated by the cam wheel 130d as above described.

As may be noted from Figures 5 and 19, the ink pads are maintained in the path of travel of the printer heads, while the machine rests in its inactive position and also during the initial motion of these heads. Each of the printer heads is given an initial downward motion to bring them into ink-receiving contact with their respective ink pads. The heads are then retracted to permit the inkers to be quickly withdrawn, and thereafter the inked heads are carried down to imprint upon the mail matter located in the printing station.

The means for giving the several printer heads this double motion, are the same, and because the means for giving the printer this particular motion is shown in detail in Fig. 18, it will be used for the purpose of description.

Referring to Fig. 18, it will be noted that the cam groove 82p is provided with a more or less abrupt change of direction as at 132p, which causes the swing arm 87p to make a relatively rapid downward and then upward motion, as this portion of the cam wheel turns past the cam roller 91p.

During this particular motion of the printer heads, the inkers are held stationary due to the design of the cam grooves of their respective cam wheels, to permit the heads to engage the ink pads; but as soon as the heads lift from the pads, they are quickly withdrawn to their retracted positions as illustrated in Fig. 19.

Ink supply

Means may be provided for maintaining the inker pads supplied with ink, in order that the machine may be actuated to make many thousands of impressions without requiring attention from the operator.

In Figure 5 these means are illustrated as including an ink tank 133d for the date circle printer head, and it will be understood that a similar ink tank for each head may be furnished. The tank 133d may be supported upon the machine frame by a suitable screw means 134d, and is of such size as to fit between the spaced arms 122d of the inker. At the lower end of the tank there may be an ink dispensing and spreading roller 135d positioned to roll over the upper surface of the ink pad as it is swung back to the position illustrated in broken lines in Fig. 19. Means may be provided to positively rotate the ink roller a portion of a revolution for each actuation of the machine, which means may include providing a ratchet wheel 136d on one end of the roller, and a driving pawl 137d slidably mounted upon the side of the tank as by means of the guide member 138d and cooperation with the ratchet wheel for turning the same. The pawl may be actuated by means of lever 139d, to which it is pivotally connected. The lever 139d may be actuated by the cam 140d operated by the inker mechanism, as is clearly shown in Figures 5 and 19.

A spring means 141d may be provided to yieldingly retain the pawl in operative engagement with the ratchet wheel. The top of the tank 133d may be provided with a filler plug 142d for convenience in refilling the tank. As each printing head is fitted with a separate inker and tank, it will be appreciated that different colored inks may be used in the different heads, or a different colored ink may be used for the advertising head from that of the postage and date circle heads, to make such advertising matter stand out clearly and noticeably.

Platen

In Figures 2, 3 and 5, there is illustrated a platen means 143 at the printing station, to support the matter being printed. It is preferable to provide each printer head with its own separate platen, which is yieldingly and flexibly mounted to permit envelopes which have bulky matter stuffed therein, to be pressed down until the upper surface thereof is substantially level and flat, to permit a clean, sharp impression to be printed thereon.

The details of construction of one of the platens is illustrated in Fig. 5, wherein the platen head 144d may have a cup formed in its upper surface to receive the resilient mat 145d, which may be formed of soft rubber. The platen head should be somewhat larger than the printer head, so that the type face of the printer will engage only the resilient mat of the platen should the machine be actuated without an envelope, or other material to be printed, in the printing station. The platen head may be rectangular in form and provided around its lower edge with a flange 146d to engage the inturned flange 147d of the retaining member 148 suitably fastened to the platen housing 149, as by means of screws 150. The platen may be yieldingly maintained in its upper position by means of spring 151. By this arrangement it will be appreciated that the platen head may be depressed and tilted as the case may warrant, as these heads fit relatively loosely in the retaining members and housing. It will be understood that a single housing 149 and a single retaining member 148 may suffice for supporting the three platens, and that the retaining member may be provided with three flanged openings through which the three platen heads may project.

Guard Box

Figure 17:
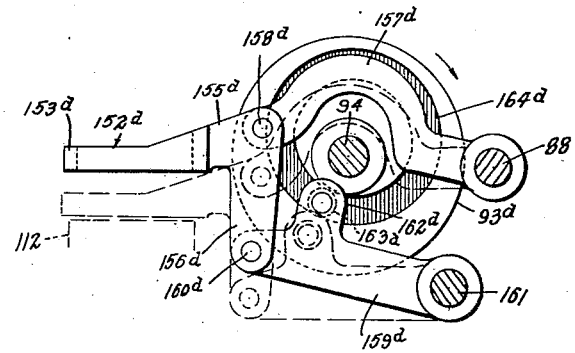

As illustrated in Figures 5, 16 and 17, the machine may be provided with three guard boxes, one for each printer head, to prevent fraudulently obtaining more than a single impression on more than one piece of mail matter for each actuation of the machine. The guard boxes also function to flatten the mail matter down upon the platen, and to so hold it during the printing operation.

The three guard boxes are alike, and for convenience the date circle guard box will be described. However, the letters "p", "d" or "a" will be affixed after the numbers on the drawings to show the corresponding parts of the other guard boxes.

In Figures 5, 16 and 17, the guard box 152d may include a box section 153d and a pair of rearward extending arms 154d and 155d. In Figure 17 it may be noted that the arm 155d is provided with a downwardly projecting leg 156d.

The guard box may be operatively supported by a pair of links, the upper 157d of which may be pivotally connected to the guard box arm 155d at 158d, and at its opposite end to the shaft 88, while lower link 159d may be pivotally connected to the lower end of leg 156d as at 160d, and at its other end to shaft 161. The lower link 159d may be provided with an offset section 162d for operatively carrying a cam roller 163d, which roller is adapted to travel in the eccentric cam groove 164d formed on the face of the cam wheel 93d opposite to the cam groove 92d.

By supporting the guard box upon these two levers, its motion will be nearly directly up and down. During the first half of the rotation of the came wheel 93d, the guard box will be moved downwardly ahead of the downward movement of the printer head, which first must complete its inking operation before moving down to printing position, and thus the guard box will engage the envelope first and press the same down flatly upon the platen. After the guard box has firmly clamped the envelope squarely upon the platen, the printer head is brought down relatively quickly to print upon the held envelope, and then is relatively quickly returned to its starting position while the guard box moves slowly up to release the printed envelope at about the same time that the inker swings back into position to cover the face of the printing type. As the printer swings into the square opening formed in the guard box during the major portion of its printing stroke, the type face thereof is protected at all times against the taking of fraudulent impressions.

Registers

The omni may be equipped with two registers, one arranged to add the money value of each indicia printed to the amount previously registered therein, while the other may be arranged to subtract the money value of each indicia printed from the sum previously registered therein.

The first of these registers has been referred to as the adding counter or register 62, and the second as the subtracting or control register 64. Excepting for the control or locking mechanism, the transfer cams and the reverse order in which the numerals are engraved on the register wheels of the control register, the two are substantially identical in structure and operation.

With the above set forth exceptions, these meters are old and well known by those conversant with this art, and therefore a description of the control register which embodies these exceptions, is deemed sufficient for a full understanding of both. However, for convenience in locating the several parts upon the drawings, the corresponding parts of these two registers will be given the same numbers with the letter "c" added to the control register parts, and "m" added to the adding register parts.

The two registers are of the reciprocating type, and may be reciprocally mounted in a common swing frame 165 (Fig. 10) formed of side members 166 and 167, and a center member 168.

The upper end of each of the members 166, 167 and 168 may be journaled upon shaft 169 and retained in correct position thereon by the bifurcated brackets 170 (Fig. 5) which also support shaft 169, while the lower end of each of these members may be fastened to a cross member 171. Guideways 172 may be formed in the members 166, 167 and 168 for the rollers 173 of the meters to travel in. It will be noted that the center member has two guideways, one on each side face.

The control register may be provided with the spaced shafts 174c and 175c, to each end of which may be journaled the rollers 173, and these shafts may be mounted in the formed steel frame 176c. A plurality of numeral registering wheels may be operatively mounted upon shaft 174c, and in this instance, there are seven of these wheels which may be designated as follows: the half cent wheel 177c; the cent wheel 178c; the tens of cents wheel 179c; the dollar wheel 180c; the tens of dollars wheel 181c; the hundreds of dollars wheel 182c; and the thousands of dollars wheel 183c. It will be understood that a greater or a lesser number of these registering wheels may be provided according to the service for which the machine is to be used. Each of the numeral wheels 177c to 180c may be provided with a driving pinion 184c and a ratchet wheel 185c (Figs. 5 and 11).

The driving pinions 184c cooperate with the selector driving racks 71h, 71c, 71t and 71d, to rotate the related numeral wheels during the down stroke of the control register (Figs. 6 and 13), in proportion to the denomination selected for printing, while the driving pinions 184m of the adding register, cooperate with the selector driving racks 63h, 63c, 63t and 63, to rotate the related numeral wheels in proportion to the denomination selected for printing during the down stroke of this register. In other words, both the subtracting and adding register numeral wheels for the one-half cent to and including the dollar wheels, are rotated in proportion, to the value set by the selector for printing as the registers are moved downwardly during their reciprocating cycle. It will be noted that the dollar selector lever 54 is the highest order of the selector means. However, should selector levers of still higher order be provided, then driving racks and pinions will be needed for the registering numeral wheels of these higher orders, or if the dollar selector means is not included, then the driving pinions for the dollar numeral wheels 180c and 180m may be dispensed with.

During the up stroke of the reciprocating cycle of the registers, the transfer mechanism will operate to turn the numeral wheels of higher order one unit when their respective numeral wheels of lower order have completed a full revolution.

Each of the transfer mechanisms for the cent to dollar numeral wheels, as illustrated in detail, Fig. 11, may include a pawl 186c engageable with the ratchet wheel 185c when released from the trip lever 187c by means of the pin 188c carried by the numeral wheel of the next lower order. The pawl 186c may be pivotally carried upon one end of the cam lever 189c, which lever may be pivotally mounted upon the register frame 176c as at 190c, while the free end thereof may carry a cam roller 191c in position to engage and travel over the transfer cam 192c. A spring 193c may be provided to yieldingly urge pawl 186c into engagement with the ratchet wheel, and also retain this pawl and the cam lever in their retracted positions. A spring 194c may act to yieldingly urge the trip lever 187c into latching engagement with the transfer pawl 186c. The register frame 176c may be slotted as at 195c to receive the tail 196c of the trip lever 187c in order to provide a convenient means for limiting the action of the trip lever. A spring weighted pawl 215c may be provided to also act on the ratchet wheel 175c to prevent the associated numeral wheel from being turned backward.

The operation of the transfer mechanism may be briefly described as follows: If the numeral wheel of next lower order is turned sufficiently during the down stroke of the register to carry the trip pin 188c past the shoulder 197c of the trip lever, which shoulder projects into the path of travel of the pin, the forward end of this lever will be depressed until the arm 198c of the transfer pawl 186c will have moved from the first notch 199c to the second notch 200c of lever 187c, thus throwing the nose of the transfer pawl into alignment with the nearest tooth of the ratchet wheel 175c, so that during the up stroke of the register, the cam roller 191c will engage the transfer cam 192c to swing the cam lever in a counter-clockwise direction as viewed in Fig. 11, to thrust the transfer pawl upwardly sufficiently to engage and advance the ratchet wheel 175c one tooth. While the transfer pawl is rotating the ratchet wheel, it is rotated in a clockwise direction as viewed in Fig. 11, sufficiently to permit the forward end of the trip lever to swing upwardly under the influence of spring 194c to again latch the arm 198c in its first notch 199c, and to thus return to its original starting position with the transfer pawl as it is returned to its inactive position under the influence of spring 193c when the cam roller 191c is moved out of range with the transfer cam. On the next operating cycle of the machine if the trip pin 188c does not actuate the trip lever 187c, then this lever will hold the nose of the transfer pawl from dropping into engagement with the nearest tooth of the ratchet wheel, and in this way will prevent the pawl from rotating the ratchet wheel. It will be understood that the ratchet wheel 185c has ten teeth to correspond to the numerals engraved upon its associated numeral wheel.

The transfer of all of the numeral wheels does not take place simultaneously, but successively, starting from the cent wheel on through to the wheel of highest denomination. In order that the transferring operation may be successively performed, the transfer cams for the several transfer mechanisms are successively of a different length, as may be noted in Fig. 6, the longest of the transfer cams being for the transfer of the cent wheel, while the shortest is for the tens, hundreds and thousands transfer mechanism, which mechanism will be described next.

The transfer mechanism for the ten, hundred and thousand dollar numeral wheels, is illustrated in Figure 12, and is similar to the transfer mechanisms for the other numeral wheels, but differs therefrom principally in having a single trifurcated transfer pawl 201c. As may be noted from Fig. 12, the three fingers 202c of this pawl, are not in alignment, so that when the first of these fingers engages the regular teeth of the ratchet wheel 203c of the ten dollar numeral wheel 181c, the other two fingers will be held clear of the teeth of their respective ratchet wheels. The ratchet wheel 203c is provided with a relatively deep notch 204c adjacent one tooth thereof, whereby when the ratchet has turned to the position as illustrated in Fig. 12, the first finger will drop therein until the second finger engages the teeth of its related ratchet wheel 205c fixed to the hundred dollar numeral wheel 182c, and thus both ratchet wheels together with their numeral wheels, will be advanced one unit. Like ratchet wheel 203c the ratchet wheel 205c is provided with a transfer notch 206c, whereby when these two ratchet wheels turn to present both notches to the fingers, the pawl will be permitted to move toward the ratchet wheels sufficiently to permit the third finger to engage the teeth of the ratchet wheel 207c fixed to the thousand dollar numeral wheel 183c, whereby all three ratchet wheels together with their attached numeral wheels, will be turned one-tenth of a revolution.

The trifurcated transfer pawl 201c may be operatively carried by one end of the cam lever 208c and yieldingly urged toward the ratchet wheels by the spring 209c. The cam lever 208c may be provided at its free end with a cam roller 210c engageable with the transfer cam 211c (Fig. 5), which is the shortest of the several transfer cams, for rocking the cam lever and thereby thrusting the trifurcated transfer pawl upwardly. The transfer pawl will be held clear of the several ratchet wheels by the trip lever 212c, which is similar in all respects but one with the trip lever 187c; the one difference being that the trip lever 212c is provided with but a single notch 213c to permit the pawl to swing freely in the direction of the ratchet wheels once the trip lever is depressed by the trip pin 214c carried by the dollar numeral wheel 180c. Each of the ratchet wheels may be provided with a spring weighted pawl 216c to prevent the numeral wheels from being turned backward. It will be understood that the trip lever 212c is provided with a spring and actuates in a meter frame slot in a similar way to the trip lever 187c.

The control and adding meters are simultaneously reciprocated up and down in the swing frame, and the swing frame is swung toward the rear of the machine during the down stroke of the meters to bring the numeral wheel driving pinions 184c and 184m in alignment with the selector racks 63h, 63c, 63t, 63d, 71h, 71c, 71t and 71d. When the selector levers are all set at their zero positions, the teeth of these racks are maintained just below the range of travel of the numeral wheel pinions, but if one or more of the selector levers is or are actuated to a particular setting, the selector rack or racks will be elevated to bring the same number of rack teeth into the path of travel of the pinions, as is represented by the setting of the lever or levers. As, for example, in Fig. 6, the cent selector lever 52 has been actuated to a three cent setting, that is, opposite the numeral 3 as indicated on the casing and through the sectoral gear 56c has elevated the selector rack 63c, and through the mechanism previously described, the selector rack 71c a distance equal to the pitch of three of the teeth formed along these racks, whereby as the meters move downwardly, the cent numeral wheel pinions 184c and 184m will engage these three teeth of these racks, and as a result thereof they will be turned three teeth or three-tenths of a revolution to add into register 62 the value of three cents, and simultaneously subtract three cents from the control register. At the completion of the down stroke of the meter, the swing frame is swung forwardly to shift the numeral wheel pinions free from the selector racks and to bring the cam rollers of the transfer mechanism into position to engage the transfer cams during the up stroke of the meters to thereby actuate the transfer mechanism during this portion of the operating cycle of the machine.

The means for swinging the register frame are most clearly illustrated in Figures 5 and 14, and may include a pair of spaced cam wheels 217 fixed to the main drive shaft 98 of the machine. A cam groove 218 may be formed in the inner side face of each of the cam wheels, and the path of these grooves may be observed from their center lines as indicated in dot and dash lines in Fig. 5. A connecting rod 219 may be pivotally connected to each lower corner of the swing frame as at 220, and each connecting rod is provided at its other end with a forked head 221 adapted to nicely straddle the main shaft 98 to form a guide for this end of the connecting rod. The collars 222 may be fixed upon shaft 98 to maintain the forked ends of the connecting rods in operative engagement with the side faces of their respective cam wheels, and the connecting rods may each carry a cam roller 223 adapted to travel in the grooves 218 of their related cam wheels. The eccentricity of the cam grooves at substantially diametrically opposite points thereof, will cause the connecting rods to be thrust forwardly or backwardly as the case may be, to swing the register frame to align the numeral wheel pinions with the selector racks at the start of the downward stroke of the registers, and to swing the register frame at the start of the up stroke of the registers to bring the transfer mechanism into position to be actuated by the transfer cams.

The registers may be reciprocated by means illustrated in Figs. 6 and 14, wherein the main drive shaft 98 of the machine is shown as having two cams 224 fixed thereon, and each cam wheel having a similar cam groove 225, the paths of which are indicated in Fig. 6 by the dot and dash center line 226. A drive lever 227 may be provided for each register and each lever having one end pivotally connected to the machine frame as at 228, a forward end slotted as at 229 to operatively engage the lower meter shaft of their respective registers, and each lever intermediate its ends may carry a cam roller 228' adapted to travel in its respective cam wheel groove 225. Due to the eccentricity of the cam grooves 225, the slotted ends of the driver levers will be swung up and down to in turn simultaneously reciprocate the two registers. The swing frame cams 217 and the register reciprocating cams 224 are all fixed to the main drive shaft 98, and therefore, it is a simple matter to time the actuation of these cams to insure the swinging of the register frame at each end of the reciprocatory strokes of the registers.

Drive

It will be appreciated that all of the operating elements of the machine are driven directly from the main shaft 98 or by the cam wheel shaft 94, which cam shaft is in turn driven from the main shaft 98, and therefore the entire machine may be driven through a complete operating cycle by rotating this main shaft one revolution. The main shaft may be manually rotated or rotated by the power plant when coupled thereto. The manual actuating means will be described first.

The manual driving means for omni

Referring to Figure 1, 2, 3 and 4, the hand crank 230' is illustrated as being removably mounted upon the stub shaft 230 and operatively connected with a concentric quadrant gear 231 by means of key 232 engageable in the slot 233 formed in the crank hub (Fig. 1). The quadrant gear may mesh with a spring gear 234 journaled upon the stud 235. This spring gear may be provided with a drum 236 in which the clock spring 237 may be mounted. One end of spring 237 may be secured to the drum, while the other end may be fastened to flanged member 238 also journaled upon the stud 235 but made fast thereto by the screw means 239 (Fig. 4). The purpose of this structure is to return the crank handle to its starting position after it has been depressed to actuate the machine. The tension of spring 237 may be adjusted by loosening screw 239, turning the flanged member 238 until the desired tension has been wound into the spring, and thereafter tightening the screw to clamp the flanged member in its adjusted position. The spring gear 234 may mesh with the drive gear 240, which latter gear may be journaled upon the main drive shaft 98.

On the hub of the drive gear 240 may be fixed a crank arm 241, to the outer end of which may be pivoted, as at 242, a driving pawl 243 (Figs. 3 and 4). Fixed on the end of shaft 98 is the collar 244 which is provided with two spaced cylindrical surfaces 245 and 246. The cylindrical surface 246 may be provided with a ratchet notch 247 into which the driving pawl may engage to drive the collar and thereby shaft 98 when the driving gear is rotated by the hand crank 230'. A flat spring 248 carried by the crank arm, may act to yieldingly urge the pawl into engagement with the cylindrical surface 246, and into the notch 247 when in register therewith. The cylindrical surface 245 may be provided with an oppositely directed ratchet notch 249. The nose 250 of the control pawl 251 may ride upon the cylindrical surface 245 until it rides into the ratchet notch 249 to stop further rotation of shaft 98 at the completion of the operating cycle of the machine. The control pawl may be pivotally mounted upon the machine frame as by a screw means 252, and yieldingly urged to rotate in a counter-clockwise direction as viewed in Fig. 3, by means of spring 253. The end 254 of this control pawl may carry a cam roller 255 adapted to engage the cam plate 256 carried by the quadrant gear 231 when the crank handle 230' is at its starting position, as illustrated in Fig. 3, to hold nose 247 of the pawl clear of the ratchet notch 249.

The omni may be manually operated by swinging the hand lever 230' in a clockwise direction, as viewed in Fig. 3, to in turn rotate the quadrant, spring and driving gears. The rotation of driving gear 240 in the direction of the arrow in Fig. 3 will consequently rotate the crank arm 241, and the driving pawl 243 carried by the crank arm, will engage the ratchet notch 247 and thus drive the collar and thereby the main driving shaft 98. Shortly after the collar 244 has started to rotate, the roller 255 of the control pawl will roll off the cam plate 256, whereupon the control pawl will rotate under the influence of spring 253 until the nose 250 engages the cylindrical surface 245 of the collar. The control pawl nose will not drop into the ratchet notch 249 at this time, as the collar will have been turned sufficiently to throw the notch out of alignment therewith. However, after the main driving shaft 98 has made a complete revolution, the nose of the control pawl will ride into notch 249 and stop further rotation. As may be noted in Fig. 3, the control pawl may be again released only when the hand crank has been returned to its initial starting position, whereupon the cam plate will again engage the roller 255 to swing the pawl clear of the notch. This feature is important as it will prevent the operation of the machine, unless the crank handle is first returned to its starting position, and thus insuring that the omni will be driven through a complete operating cycle each time the handle 230' is pressed. The clock spring 237 will act to return the crank handle and the other parts of this manual drive mechanism to their starting positions after each actuation thereof.

When the omni is power-driven, the collar 244 will rotate in the direction of the arrow in Fig. 3, and will rotate freely under the manual driving pawl 243, and the crank handle 230' will be left in its retracted position or even better, removed from the machine while it is being power-driven, and the control pawl 251 will be held disengaged from the ratchet notch 249 so as not to interfere with the operation of the machine while being so driven.

*Power driving means*

The power driving means of the omni are most clearly shown in Figures 5 and 14, and may include a pair of spiral gears 257, one of which may be fixed upon the main drive shaft 98, while the other may be fixed to the short coupling shaft 258. The coupling shaft 258 may be journaled in bearing 259, and upon its outer end there may be slidably but not rotatably mounted a coupling member 260 adapted to engage in driving relation with a cooperating coupling member 261 carried by the clutch shaft 262 of the power plant.

Each time the one cycle clutch 49 of the power plant is released, it acts to drive the clutch shaft 262 and the coupling member 261 through a single revolution, and then automatically disengages.

With the coupling member 260 shifted into driving engagement with the member 261, the drive of the clutch will be transmitted through the coupling shaft, and the spiral gears in turn rotate the omni drive shaft one revolution each time the clutch is tripped into driving engagement. This makes a simple but positive driving means which may be easily and quickly disconnected from the power plant driving means by sliding the coupling member 260 out of engagement with power plant coupling member 261, or as easily and quickly coupled thereto by sliding the coupling member 260 into driving engagement with the power plant coupling member 261. To facilitate sliding the coupling member 260 to or from driving engagement, it may be provided with a relatively large knurled flange 263.

To prevent the main drive shaft 98 from being turned backward, there may be fixed to this shaft a ratchet wheel 273 (Figs. 4, 14 and 15) against which the pawl 274, pivotally mounted upon the machine frame as by screw 275, may be yieldingly urged by the flat spring 276.

*Omni power plant mounting*

The omni may be easily and quickly mounted upon the power plant by providing a pair of cylindrical feet 264 at the drive end thereof. A similar pair of feet 265 may be provided adjacent the other end to provide means for equally supporting the omni when not coupled to the power plants, (Fig. 3).

In Figure 5 the feet 264 are illustrated as projecting through bores 266 (illustrated in broken lines) of the power plant base and latched therein by the latch member 267 pivoted to the power plant base as by screw means 268. The latch is provided at each end with a slotted opening 269 adapted to be swung into engagement with the annular locking groove 270 of each of these feet, to lock the omni in its operative position upon the power plant base, and in which position the coupling shaft 258 of the omni will be in correct alignment with the clutch shaft 262 of the power plant, whereby the coupling 260 may be shifted into driving engagement with its companion coupling member 261 to complete the driving connection between the omni and power plant.

The latch member 267 may be provided with a handle 271 (Figs. 2 and 5) for swinging the latch to or from locking engagement. As may be observed in Fig. 2, the handle 271 projects through the slotted opening 272 formed in the end cover of the power plant.

This form of mounting has been found to securely retain the omni in its correct driving position upon the power plant, and permits the omni to be easily and quickly coupled to or removed therefrom.

Safeguarding the omni

Several different means are provided for safeguarding the omni against unauthorized persons tampering with it in an attempt to obtain more postage from the machine than has been paid for. These protective means may include first, sealing the omni within a protective casing; second, providing a locking mechanism for locking the machine against operation unless a value has been set up for printing and registering; third, a key-actuated means for locking the machine against use by persons not authorized to operate the machine; fourth, a selector locking means; and fifth, a progressive locking system which is set into operation by the control register to lock the omni against further use when the amount registered in the register coincides with or falls below nine dollars ninety-nine and one-half cents, which represents the maximum printing capacity of the machine and this locking system includes means for releasing the machine for further use when the maximum printing capacity has been reduced to ninety-nine and one-half cents, and this progressive locking system is again brought into action to finally lock the machine when the amount registered in the control register has been reduced to or below this reduced printing capacity.

Each of these several means will be described in detail in the order as presented above.

Omni casing

The omni may be sealed within the casing 50 by any appropriate means not shown. A door 277 (Figs. 1, 2 and 35) may be provided to permit access to the control register in order that the amount of postage purchased may be set up therein by an authorized postal official. The door will be locked closed by a suitable lock as indicated at 278, and the key for this lock will be left in the possession of the post-office official who is authorized to set the register for each purchase of postage. A glazed window 279 is provided in the door to enable the control register to be read.

Just below the control register door there is a second and larger door 280 provided with a suitable lock as indicated at 281. The key for this lock will be kept by the person in charge of the omni, and may be used to open the door when it is necessary or desirable to reach the inking mechanisms or the date circle for setting or the advertising head. It will be appreciated that the control register may not be reached through this lower door, and therefore cannot be tampered with.

To one side of the glazed window 279 there is a similar window 282 through which the numeral wheels of the adding register may be read. To the side of this second window there is a third and smaller window 283 through which numeral wheels of common form of counter 284 may be read. This counter is connected to register the number of times the machine actuates, and forms no part of this invention.

As shown in Figures 1 and 6, the selector levers 51, 52, 53 and 54 extend through appropriate slots 285 formed in the casing, and just below each slot the casing is provided with a peep hole 286 through which the numeral corresponding to the setting of the related lever may be clearly seen, (note Fig. 1). This feature permits an instant check upon the setting of the selector levers. To show the correct number in each of these peep holes, each selector lever may be provided with an index quadrant 287 upon the periphery of which there is calibrated the range of numbers corresponding to those which may be set up by the related selector levers. Thus in Fig. 1 the numeral "3" appears in the cent lever peep hole which indicates that this lever has been set to print and register three cents, while through all of the other peep holes the numeral "0" appears.

Mechanism for locking the omni when all of the selector levers are set at zero The mechanism for locking the omni when all of the selector levers are set at zero is shown in Figures 6, 7, 8, 9, and 14, and may include a pawl 288 pivotally mounted upon the machine frame as by the screw means 289 and provided with an offset nose 290 adapted to enter the locking notch 291 formed in the periphery of the locking wheel 292. The locking wheel may be securely fastened upon the main drive shaft 98 (Figs. 6, 9 and 14), so that when the nose 290 of the pawl is in engagement with the locking notch, the main driving shaft of the machine will be positively locked against rotation, and thus the machine cannot be operated until the nose of the pawl is lifted clear of the locking wheel.

To swing the pawl free of the locking wheel when a denomination of any value is set up by any one of the selector means, the rear end of the pawl may be formed as illustrated in Figure 8, to underlie the rear ends of the selector lever pawls 293d, 293t, 293c and 293h. The half-cent selector pawl 293h has been omitted from Figures 7 and 8, but is shown in Fig. 38, and in the same figure the formed end 294 is illustrated as passing under the selector pawls 293c and 293h, and thereafter projecting forwardly as at 295 to be journaled upon the pivot screw 296. Screws 296 and 289 are in alignment to provide a center of rotation about which the formed locking pawl may freely pivot. The offset center section 297 of the formed end of the locking pawl is for the purpose of clearing the register reciprocating cam wheel 224.

The forward ends 298h, 298c, 298t and 298d of the selector pawls 293h, 293c, 293t and 293d are shaped to enter their respective cam notches 299h, 299c, 299t and 299d formed in the rear edge of the selector rack bars 57h, 57c, 57t and 57d (Figs. 6, 8 and 9), when these selector bars are in their lowermost position, which position represents the zero setting for the selector. In Figure 9 the cent selector rack bar 57c is shown in the position it would occupy when set up to a three cent valuation, and in this position as illustrated in this figure, it will be noted that the tapered end 298c of the selector pawl 293c has ridden out of the cam notch 299c, (in fact, this action will take place when the rack bar has moved to set up a one cent denomination) and in doing so, has caused the pawl 293c to rotate about its pivot 300. It will be remembered that the rear end of the selector pawl 293c rides upon the upper face of the formed end 294 of the locking pawl 288, whereby the rotation of the selector pawl 293c will rotate the locking pawl and thereby lift the nose 290 thereof clear of the locking notch 291 formed in the locking wheel 292.

As each of the selector pawls engage the formed end 294 of the locking pawl 288, it will be understood that the movement of any one or all of the selector rack bars will act to lift the locking pawl clear of the locking wheel, and thereby free the machine for operation.

It is desirable to provide means for preventing the driving clutch of the power plant from being tripped into driving engagement when the omni is locked as above described, and this purpose may be accomplished by providing the lever 302 (Figs. 5, 7, 8) pivoted at 303 and having an upwardly extending arm 304. Projecting from the lever arm 304 is a finger 305 positioned to underlie the rear end of the locking pawl 288, and also the arm may be provided with a flange 306 against which the compression spring 301 may act to yieldingly urge this lever and thereby the locking pawl 288, and also the selector pawls 293h, 293c, 293t and 293d into engaging positions. The outer end of lever 302 may be formed with a double offset portion 307, and the inturned end 308 thereof may underlie the spring lever 309, which lever may be pivoted as at 310. A spring 311 is provided to urge the spring lever downwardly to actuate the clutch cut-out pin 312 (Figs. 5, 7 and 8). However, spring 311 is not strong enough to swing the spring lever 309 downwardly as long as the lever 302 acts to lift the spring lever upwardly against the action of spring 311. It will be understood that spring 301 is stronger than spring 311, but when any one of the selector pawls is actuated by its rack bar, the locking pawl 288 will be rocked to in turn rotate lever 302 in a counter-clockwise direction as viewed in Fig. 7. This rotation of the lever will move the end 308 thereof downwardly, and free the spring lever 309 which will, as a result thereof, be rotated under the influence of its spring 311 to depress the clutch cut-out pin 312. By depressing pin 312 the clutch tripping mechanism will be freed so that it may be actuated to engage the power plant clutch for driving the omni. The connection between the clutch cut-out pin 312 and the clutch mechanism may be seen in Fig. 5, and is fully described in the patents before referred to. It will be understood, however, that when the clutch cut-out pin 312 is pressed downwardly, the clutch tripping mechanism may function and when released and moves to its upper position, the tripping mechanism will be rendered inoperative.

The lower end of pin 312 engages the head of plunger 312a of the clutch tripping mechanism. Plunger 312a is operatively connected to the free end of crank arms 312b, having its shaft portion 312c provided with a torsional spring 312d. It is this spring 312d which lifts pin 312 when permitted to do so by the locking mechanism to thereby bring about disengagement of the clutch tripping mechanism.

*Means for locking the omni against unauthorized use*

The means for locking the omni against use by unauthorized persons, is illustrated in detail in Figures 37, 38 and 39, and may include any appropriate form of key lock 313 mounted in the casing 50. A cam 314 may be carried by the rotating element of the lock, and may engage the offset end 315 of the bell crank lever 316, which lever may rotate about the pivot 317 while the arm 318 thereof may be provided with a locking notch 319. A spring 320 may act to yieldingly retain the offset end 315 of the bell crank lever in operative engagement with the locking cam 314, whereby when the lock is turned by its key 321 to the locking position as illustrated in these figures, the arm 318 of the bell crank lever will be swung until the locking notch 319 formed therein rides under the center offset portion 297 of the formed end 294 of the locking pawl 288, and thereby locking the selector levers in their zero positions as well as locking the machine. To release the omni for use, the key 321 may be used to rotate cam 314 for depressing the offset end 315 of the bell crank lever, and to thereby swing the locking notch 319 carried by arm 318 clear of the locking pawl. This accomplished, the selector levers may be actuated to set up a desired denomination for printing, and thereby releasing the locking pawl and depressing the clutch cut-out pin to place the omni in operative condition.

*Mechanism for locking the selector means in their set positions during the operating cycle of the omni*

Unless the selector means are locked during the operating cycle of the omni, it would be possible to change the ratio between the selector and postage indicia printing head as, for example, should the selector means be set to print a nine dollar stamp, the machine operates slowly, and just as soon as the pinion 83d which turns the dollar denomination printing wheel 86d, moved out of mesh with its setting gear 82d, the dollar selector lever could be actuated to a one dollar setting. This done, the printer head would print a nine dollar stamp, while the control and adding registers would register only one dollar, a difference of eight dollars. The same procedure could be carried out for the other selector levers.

To prevent such a fraudulent use of the machine, a locking means is provided for positively locking the selector levers at their selected positions, which means may include, as is most clearly illustrated in Figs. 6 and 14, a locking yoke 322 fixed to shaft 323. Spaced along the yoke are the screws 324h, 324c, 324t and 324d positioned to engage the rear ends of the selector positioning rack detents 60h, 60c, 60t and 60d during the operating cycle of the machine to positively lock these detents in the selected notches of their respective positioning racks, and to thereby prevent the selector rack bars from being moved to a different denomination.

The locking yoke may be swung into its locking position as just described, and as shown in Fig. 6 by the crank arm 325 also fixed to shaft 323 (Fig. 14) and having a cam roller 326 operatively mounted upon the free end thereof. The cam roller 326 travels on the periphery of the cam wheel 217 during the operating cycle of the omni to hold the yoke in its locking position, but upon the completion of the operating cycle, drops into the notch 327 to release the locking yoke so that it may swing freely each time one of the detents is thrust outwardly during the movement of its related positioning rack.

Each of the yoke screws may be provided with a lock nut 328 to lock the screws in correct adjustment.

The progressive locking system

The first locking operation of the progressive locking system will take place when the amount registered in the control register passes a predetermined amount. In this instance the first locking operation will take place to lock the machine against further use when the amount registered in the control register falls below ten dollars. The ten dollar point has been chosen as the predetermined amount beyond which the machine will first lock because it is about as low as the register may be run without incurring the danger of an overdraft which would automatically set up in the control register a value substantially equal to its maximum setting capacity without requiring the omni to be taken to the post-office for setting, and thus if the user of the omni were dishonest, he might use this entire amount of postage free. By "overdraft" is meant the turning of the register beyond its zero point. At this time it may be well to state that the control register need not be a subtracting register, but may be if preferred, an adding register without in any way affecting the operation of the progressive locking system. It will be understood that the first locking action does not take place at the ten dollar point, but at the first value below ten dollars as, for example, should by chance the even sum of ten dollars be left in the control register and the machine set to print and register half cent denominations, the machine will operate once to print one impression, and then will lock leaving an amount of nine dollars ninety-nine and one-half cents in the register. On the other hand, with the same ten dollars in the control register and the selector set to print and register a denomination of the maximum printing capacity of the machine, namely, nine dollars ninety-nine and one-half cents, the machine will operate once to print one impression, and then will lock, and in this case only the amount of one-half cent will be left in the register. In other words, the locking of the machine will take place within the range of its printing capacity, that is, the machine will lock at any value between nine dollars ninety-nine and one-half cents and a half cent. It will be appreciated that any other value besides ten dollars may be selected as the predetermined amount beyond which the machine will lock. This will be especially true when a machine of the invention is made to print higher denominations, say for example, ninety-nine dollars ninety-nine and one-half cents, or nine thousand nine hundred ninety-nine dollars and ninety-nine and one-half cents, or any other desired amount.

First locking means of the progressive locking system

In Figure 34, sheet 16, there is illustrated a control register detector 329, which is journaled in the control register above the numeral wheels by a suitable shaft 330 (Fig. 26). It is upon this same shaft that the pawls 215c and 216c are mounted, and to provide room for these pawls the detector is milled out as at 331. At one end the detector is provided with a relatively long and downwardly extending arm 332 upon the lower end of which is operatively mounted the cam roller 333, while extending rearwardly and downwardly and of more or less hooked shape are three feeler fingers 334, 335 and 336. The cam roller 333 travels over the cam 337 (Figs. 30 and 36) to rock the detector sufficiently to hold the three feeler fingers clear of the ten, hundred and thousand dollar numeral wheels during the up stroke of the meter to permit these wheels to be rotated by the transfer mechanism without allowing the feeler fingers to ride upon their peripheries. It will be remembered that there are no selector racks for these numeral wheels, and therefore they are not rotated during the down stroke of the register, and the feeler fingers may engage these wheels during the down stroke of the register without causing wear to either fingers or wheels. The cam roller 333 will ride off of the upper end of cam 337 just as the register reaches the upper end of its stroke (Fig. 36), to permit the detector 329 to swing from its broken line to its full line positions as illustrated in Fig. 36. However, the swing of the detector will be stopped as soon as any one of the feeler fingers engages the periphery of its associated numeral wheel unless the tripping notch 338 formed in each of these wheels has turned into registration with the feeler fingers, in which case the detector may swing further to release the tripping lever 339 and thereby bring about the locking of the machine. The tripping lever 339 is journaled upon shaft 340 carried by the control register and urged to rotate in a counter-clockwise direction as viewed in Fig. 26, by the compression spring 341. The upper end of this tripping lever has a substantially semicircular cam surface 342, which cams against the cam roller 343 carried by the rearwardly projecting detector arm 344. Normally, the thrust of the tripping lever cam surface against the detector cam roller, due to spring 341, tends to swing the detector in a clockwise direction as viewed in Figures 26 and 27, to bring the detector fingers into engagement with their respective numeral wheels. However, as pointed out, the cam arm 332 cooperating with cam 337, will act against this tendency and hold the detector feelers free of their numeral wheels during substantially the entire up stroke of the register. As soon as the roller 333 rides clear of the upper end of cam 337, the spring 341, acting through the tripping lever, will rotate the detector until the feeler fingers engage their respective numeral wheels. If one or more of the detector feeler fingers engage the periphery of its or their respective numeral wheel or wheels, the rotation of the detector and thereby the rotation of the tripping lever will be stopped before the tripping lever will have moved sufficiently to trip the first locking mechanism. But, if all of the detector feeler fingers, instead of engaging the peripheries of their respective numeral wheels, swing into the tripping notches of these wheels, the detector will be rotated further as the ends of the fingers will travel into the tripping notches (Fig. 27). This additional rotation will permit the tripping pawl to also rotate further, and this additional movement of the tripping lever, which will be referred to as its tripping movement, is made use of for tripping the first locking mechanism into action for locking the machine.

The lower end of the tripping lever 339 is provided with a relatively wide cam surface 345 (Figs. 27 and 30) which is adapted during the tripping movement of lever 339 to engage the side flange 346 of the latch member 347 to in turn swing this member rearwardly (Fig. 27) about its pivotal mounting 348 to release the locking pawl 349. The lower or free end of the latch member 347 may be provided with suitable hook 350 normally engaging the offset shoulder 351 of the locking pawl (Fig. 26). This relation is disturbed when the tripping lever acts to swing the latch member to its rearward position as illustrated in Figure 27, wherein the hooked end of this member is shown swung free from the locking pawl shoulder to thus release the pawl. As soon as the locking pawl is released, it is swung in a counter-clockwise direction as viewed in Figures 26 and 27 by the spring means 352, until its locking tongue 353 drops into the locking notch 354 of the locking wheel 355. As may be noted from Figure 14, the locking wheel 355 may be formed as an integral part of the main shaft collar 222 located adjacent the spiral driving gears. The machine is now locked and cannot be operated. To prevent the power plant driving clutch from being tripped into operation, which might cause injury to either the power plant, omni or both, the locking mechanism is provided with means for actuating the clutch cut-out pin 312 to render the clutch tripping mechanism inoperative. It will be remembered that this clutch cut-out pin 312 was also made use of by the no denomination locking means for the same purpose.

To actuate the cut-out pin 312, the rear end 356 of the locking pawl 349 is provided with a cam roller 357 adapted to engage the upper flat surface 358 of the cam plate 359 (Figs. 7, 26 and 27) carried at the lower end of the floating link 360. The upper end 361 of the floating link is pivotally and slidably mounted upon the supporting pin 362, and the sliding motion of the link is limited by the closed ends of slot 363. The under surface 364 of the cam plate also acts as a cam surface against which the cam roller 365 of the cam lever 366 is thrust as by the action of spring 367. One end of the cam lever may be pivotally mounted upon the frame as at 368, while its other end may have a nose 369 adapted to engage the offset shoulder 370 of the spring lever 309.

The cam surface 364 may have a center of curvature substantially coincident with the pivotal point of the floating lever, whereby the cam lever 366 will remain substantially stationary when the floating lever is swung from its position as shown in Figure 26, to that shown in Figure 28.

When the first locking pawl 349 is swung into locking engagement with its associated locking wheel, the roller 357 will be lifted clear of cam plate (Fig. 27) thus permitting the thrust of spring 367 to lift the cam lever 366 and through its cam roller 365 the floating link. As may be noted from Figure 7, the cam lever 366 will also act to lift the spring lever 309, as spring 367 is stronger than the spring lever spring 311, and thus permitting the clutch cut-out pin 312 to be raised and to thereby render the clutch tripping mechanism inoperative.

From the above description, it will be appreciated that when the amount registered in the control register falls below ten dollars, that not only will the first locking means function to render the machine inoperative for further use until released, but will also function to prevent the omni driving clutch of the power plant from being thrown into driving engagement.

If, for example, there had been left in the control register before the locking action took place, $10.02½, and the omni was set to print three cent denomination, then during the next operating cycle of the machine, three cents would be subtracted from the balance of $10.02½, thus leaving an amount of $9.99½ cents in the control register, and as this amount is less than the predetermined amount of $10.00, the machine will lock upon the completion of this last operation. The amount of postage paid for which will still remain in the control register after the first locking action, will be in this case, $9.99½ which is more than is desirable to leave in the register. However, unless the maximum denomination which may be printed is reduced, the control register could be overdrawn, thus automatically setting up a large value in the register and preventing the locking system from functioning. It is important therefore, if the machine is to be released so that more of this paid for postage may be printed to simultaneously with the releasing action reduce the printing capacity of the machine to a predetermined lesser amount. In the present embodiment of the invention, the dollar selector lever 54 must be returned to zero, where it will be automatically locked before the machine may be released for further service. By returning and locking the dollar lever at its zero position, the maximum printing capacity of the machine will be reduced to 99½ cents.

*Means for releasing the omni for further use*

The means for releasing the omni for further use after it has been locked by the first locking mechanism, may include a reciprocating pawl 371 pivotally mounted upon the dollar selector rack bar 70d as at 372, to reciprocate therewith. The pawl 371 may be provided with a side flange 373 (Fig. 30) against which the wide cam face 345 of the control register tripping lever 339 may engage during the tripping movement thereof.

In Figure 27 the parts are shown in the condition just described, as well as the dollar selector rack bar 70d in broken lines in position to print a denomination of a dollar or more. To complete the releasing action, the dollar selector lever 54 must be swung to its zero setting to thereby thrust downwardly the dollar rack bar 70d, and as the reciprocatory pawl 371 is carried by this bar and its lower end has been swung rearwardly by the tripping movement of the tripping lever 339, the point of the pawl 371 will strike the tapered end 375 of the release latch 376 to swing this latch about its pivot 377 against the action of spring 378, to lift its catch end 379 clear of the latch plate 380. It may be noted that the latch 376 is pivoted upon one end of the transverse shaft 67h as at 377, as is clearly shown in Figure 13.

The latch plate 380 is carried by the swing frame 381, which is pivotally mounted on shaft 348, and when released, latch 376 is caused to swing rearwardly (Figs. 27 and 28) by the spring 382 acting against and through the latch member 383. To transmit the thrust of spring 382 to the swing frame 381, the upper hooked end 384 of the latch member 383 abuts against the end 385 of the swing frame, while the lower end of the latch member is pivotally supported as at 386. When the dollar rack bar 70d reaches its zero position (Fig. 28) the hooked end 384 of the latch member 383 will latch over the dollar rack bar bracket 387 to effectively lock this rack against further use. Substantially simultaneously therewith, the cam roller 388 carried by the swing frame 381 will engage the hooked cam surface 389 formed on the first locking pawl 349, and swing this pawl in a clockwise direction as viewed in Figure 28, to withdraw tongue 353 thereof from the notch 354 of the locking wheel 355, to thereby free the machine for further use. But before the omni may be power-driven, the clutch cut-out pin 312 must be again depressed, and for this purpose the swing frame 381 is provided with a second cam roller 390 positioned to engage the front edge of the floating link 360 to swing it rearwardly (Figs. 27 and 28), whereupon the cam roller 391 carried by the rear end of the second locking pawl 392, later to be described, will ride up the inclined cam surface 393 onto the contiguous cam surface 358' of the floating link cam plate 359, and thereby depress the floating link 360. The downward movement of the floating link depresses the cam lever 366 (Fig. 7) to release the spring lever 309 so that its spring 311 may act to swing this lever downwardly and thereby depress the clutch cut-out pin to again release the clutch tripping mechanism so that it may be put into use.

The omni is now fully restored to its former operative condition except for the dollar selector means which is locked at zero to prevent the printing an indicia of over 99½ cents.

Final locking mechanism

The omni may now be operated until the amount registered in the control register passes a lesser predetermined value which, in this case, is one dollar. When the amount registered in the control register passes or falls below one dollar, the final locking mechanism will function to finally lock the machine. To reset the finaly locked omni, it must be taken to the post-office for an additional purchase of postage. The amount of this purchase will be set up in the control register by the post-office official, and the machine released for use.

The final locking mechanism may include a second detector 394 (Fig. 33) journaled upon the control meter shaft 330, and straddles the first detector 329 also journaled upon this same shaft (Fig. 30). The second detector is provided with a single feeler finger 395, and connected thereto by the cross bar 396 is the cam arm 397, upon the outer end of which is operatively mounted the cam roller 398. The feeler finger 395 cooperates with the dollar numeral wheel 180c, but as its cross bar 396 rides upon the first detector 329, it is prevented from dropping into the tripping notch 399 until the first detector is actuated through its tripping motion to swing sufficiently to release the second detector. In this same way the second detector is swung to lift its feeler finger 395 during the transferring operation of the machine, to thereby prevent wear of the dollar numeral wheel periphery, as well as the engaging end of the finger. The first detector will swing through its tripping motion each time the roller 333 rides off the end of its controlling cam 337, at substantially the end of the up stroke of the register, due of course, to the fact that there now remains less than ten dollars registered in the register, and the ten, hundred and thousand dollar numeral wheels have turned to show a zero reading through the window 279 of the casing, and the tripping notches of these wheels will remain aligned with the feeler fingers of this detector. For this reason, when the machine has been released for further use after the first locking action, the second detector will be swung far enough at substantially the end of each operating cycle of the machine, to permit the feeler finger 395 to feel the periphery of the dollar wheel, and if the tripping notch 399 has not turned to register therewith, the machine may again function, and so on until finally the notch 399 will register with this finger, whereupon the second detector will be free to swing through its tripping motion. The tripping motion of the second detector is transmitted through its cam roller 398 to act upon the semi-cylindrical cam surface 400 of the second tripping lever 401, to permit this lever to swing about its pivot 340 under the influence of its compression spring 402, far enough for the lower end 403 of the lever, to engage and in turn swing the second latch member 404 about its pivot 348 to disengage the lower hooked shaped end 405 thereof from the offset shoulder 406 of the final locking pawl 392. The second locking pawl 392 may be pivoted on shaft 407 and urged to rotate in a counter-clockwise direction as viewed in Fig. 29, by its compression spring 408, and also it may be provided with a locking tongue 409. When the second locking pawl 392 is released, its tongue 409 will drop into the notch 410 cut in the periphery of the final locking wheel 411, which may be carried by the collar 222 (Fig. 14). As this collar is fixed to the main drive shaft 98 of the machine, the engagement of the tongue in the notch will positively lock the machine against further use.

It is desirable when finally locking the omni, to also release the clutch cut-out pin 312, to prevent the omni driving clutch 49 of the power plant from being tripped into driving engagement. As will be remembered, it was the cam roller 391 carried by the rear end of the second locking pawl, which acted against the tapered cam surface 393 of the cam plate 359 carried by the floating link, which caused this floating link to be pressed downwardly to thereby, through the mechanisms previously described, depress the clutch cut-out 312 to release the clutch tripping mechanism. When the second locking pawl swings into locking position as shown in Figure 29, the rear end thereof will be elevated, whereby the cam roller 391 will be lifted clear of the floating link 360. Having released the floating link, the clutch cut-out pin 312 will be free to rise, in the manner previously described, to render the clutch tripping mechanism ineffective for releasing the driving clutch 49.

The omni is now finally and securely locked, and may be set up for further operation only by a post-office official upon the purchase of additional postage.

The simplest form of the progressive locking mechanism has been shown in order to simplify the drawings and description, and it will be appreciated that this system may be extended to progressively lock, and release the machine as many times as necessary before the final locking action takes place. For instance, if the omni is arranged to print a maximum denomination of $9,999.99½, the first locking action may take place when the amount registered in the register falls below $10,000.00. The machine released when maximum printing capacity is reduced to $999.99½, and a second locking action taking place when the amount registered in the register falls below $1,000.00. The machine released for a second time when the maximum printing capacity is reduced to $99.99½. A third locking action takes place when the amount registered in the register falls below $100.00, again released by reducing the printing capacity to $9.99½, and from then on following the plan already described.

*Control register setting mechanism*

When the omni is taken to the post-office to have a new amount, representing a purchase of postage, set up in the control register, the post-office official will use the key which was previously deposited with the post-office for unlocking and swinging the control register door 277 open, as shown in broken lines in Figure 35.

To facilitate the resetting of the progressive locking and releasing system, a mechanism is associated with the door, which will act as the door is opened to return to their initial positions these mechanisms, and also operative for swinging the two control register detectors free of their respective numeral wheels.

The means for swinging the two detectors clear of their numeral wheels, is illustrated in Figures 35 and 36, wherein a cam 412 fixed to shaft 413, is positioned to engage the arm 332 of the first detector 329 and swing it from its full line position to its broken line position, as shown in Figure 36. This action will swing both the first and second detectors, as it will be remembered that an upward motion of the first detector will bring the frame of that detector into engagement with the cross bar 396 of the second detector, whereby both will be moved as one, to swing all of the feeler fingers clear of their respective tripping notches, thus freeing the numeral wheels so that they may be turned to set up the new amount.

As the two detectors are rotated free from their numeral wheels, the cam rollers 343 and 398 will travel along the semicircular cam surfaces 342 and 400 of their respective tripping levers, to return these levers to their initial positions and to thereby free the latch levers 347, 404, and the reciprocating pawl 371.

The hooked end 350 of the first latch member 347 will hook under the offset shoulder 351 of the first locking pawl when it returns to its normal position, as this pawl is retained elevated as shown in Figure 28, by the swing frame cam roller 388 engaging the cam surface 389 of this pawl. While the return of the reciprocating pawl 371 will release the pawl 376 to again latch over the latch plate 380 of the swing frame as this frame is returned to its original position, as will be later explained.

To turn shaft 413 a crank disc 414 (Figs. 30 and 35) may be fixed to one end thereof, and by means of the connecting rod 415 connected to the door bracket 416, whereby as the door is swung open, the connecting rod will move upwardly to its broken line position as illustrated in Figure 35, to rotate the crank disc and thereby shaft 413.

The floating link 360 may serve to return the swing frame 381 and the second locking pawl to their normal positions at the same time this link is returned.

The means for returning the floating link 360 to its normal position may include a bell crank 417 pivoted to the machine frame as at 418 and operatively connected to the crank disc 414 by the connecting link 419 so as to be rotated in a counter-clockwise direction when the control register door 277 is opened. The bell crank 417 is provided with an inwardly projecting pin 420 which, at the start of the resetting cycle, stands just above the offset portion 421 of the floating link 360 in order to provide a short time interval for the other members to be reset before the pin 420 engages the offset portion 421 to depress and at the same time swing the link to its original position. As the floating link 360 is returned to its normal position, it will engage the swing frame cam roller 390, and will thereby return the frame to its original setting, whereupon the releasing latch 376 will again latch over the swing frame latch plate 380, and the floating link will also act to swing the second locking pawl 392 upwardly until its offset shoulder 406 will latch over the hooked end 405 of the second latch member 404. This is accomplished by providing the floating link with a cam roller 422 (Figs. 26, 27, 28 and 29), which will engage the rear end of this pawl and swing it in a clockwise direction, as viewed in Figure 29, until it is latched up by the latch member 404. It will be understood that the forward swing of the swing frame 381 will push the latch member 383 back to free the bracket 387 of the dollar selector rack bar 70d, thus freeing the dollar selector means for use.

In Figures 11 and 30 there is shown a headed stylus 423 for each of the control register numeral wheels. Each stylus is arranged to engage the teeth of the ratchet wheel for turning its related numeral wheel. A spring 424 is provided to yieldingly hold the transverse limit pin 425 of each stylus against the upper supporting bracket 426 and to thus hold the ratchet engaging ends of these styluses clear of the teeth of their respective ratchet wheels.

By pressing upon the head 427 of any particular stylus, the corresponding numeral wheel will be turned one-tenth of a revolution, and in this way the control register may be easily and quickly set to the particular amount desired.

The transfer cams 192c, for the cent, ten cent, dollar and thereabove numeral wheels, are made sufficiently long so that the cam rollers 191c and 210c which actuate the transfer mechanisms for these numerals wheels, do not leave the cams at the end of the up stroke of the control register.

As a result thereof, the transfer pawls 186c and 201c are retained in their upwardly thrust positions, so that during the setting of the numeral wheels, should any one or all of the trip lever pins 188c be turned to engage the shoulder or shoulders 197c and thereby rock the trip lever or levers 187c or 212c, that action will not affect the transfer mechanism, as during the time which the transfer pawls are thrust upwardly, the trip levers are more or less free from the pawls, and upon the return or downward movement of the pawls, they will ride into the notch or notches 199c or 213c as the case may be, to be thereby retained in their inactive position or positions until released during the normal operation of the register. If these cams were not made sufficiently long to so hold the pawls, the setting of the numeral wheels would rock the trip levers and release the transfer pawls, whereby upon the next operation of the machine, those pawls which were tripped, would function to turn their associated numeral wheels, and thus disturb the true setting of this register.

*Indicating means for first locking mechanism*

To apprise the attendant as to the reason for the locking of the machine, an indicator may be provided, which will indicate that the first locking mechanism has functioned to lock the omni.

This will also serve as a warning to show that the postage remaining in the register is running low.

The indicating means may include a member 428, which will be referred to as the flag, normally retained out of register with the casing opening 429, as indicated in broken lines in Figure 35, and swung into register with this opening simultaneously with the first locking action. The surface of the flag, which may be seen through its window, may be enameled red so as to attract attention thereto, and if desired, may carry suitable wording to advise that the first locking mechanism has acted, and/or that the amount of postage remaining in the register is running low.

The flag may be carried upon the free end of the flag lever 430 pivoted to the omni frame as at 431. As may be seen in Figures 26 and 35, the flag lever is provided with an arch-shaped rearwardly extending arm 432 having a correspondingly shaped stop slot 433. When the flag arm is in the position as illustrated in Figure 26, this stop engages the cross member 434 of the frame. The flag lever is yieldingly maintained in this position by the overcenter spring 435.

The flag lever is swung to its warning position when the first locking mechanism functions. This action is brought about by providing the first latch member 347 with a rearwardly extending arm 436 and offsetting the end 437 thereof in such a way as to underlie the arch-shaped arm 432 of the flag lever. When the latch member is actuated, its offset end 437 will engage the flag lever arm and thus swing the flag lever until the center line of the over-center spring is passed, whereupon the flag lever will complete its travel under the influence of the over-center spring until it has moved into its warning position as illustrated in Figures 27 and 35. The rotation of the flag lever is stopped when the forward edge of the flag engages the omni frame as at 438 in Figure 35.

The flag is returned to its out of sight position during the control register resetting operation. For this purpose the connecting link 419 may carry a finger 439 which will engage the flag lever pin 440 (Fig. 35) during the rearward travel of this link, and to thereby rock the flag lever backwardly until the center line of the over-center spring is passed, whereupon this spring will act to swing the flag lever until its arch-shaped stop slot 433 will again engage the cross member 434. The over-center spring will yieldingly retain the flag in its out of sight position until again actuated by the first locking mechanism.

Hand sealing means

When printing over-weight mail, the gummed surface of the envelope flaps may be wetted by manually passing the flaps between the under surface 441 of the power plant, (Figs. 1 and 2), and the top end of the capillary wetting brush 442. The wetting brush is mounted in a water container 443, which is mounted upon the power plant in any approved manner.

To permit this over-weight mail to be readily inserted into the printing station when the omni is mounted upon the power plant, wheeled truck 444 of the automatic envelope feeding means may be removed readily by lifting the spring-weighted positioning bar 445. This mechanism is fully disclosed in the patents referred to, and therefore need not be described in detail.

Positioned in the front of the power plant, is the hand-tripping lever 446, which may be pressed manually each time an envelope is placed in the printing station to trip the driving clutch 49 and thereby actuate the omni.

Having fully described the invention, it is to be understood that it is not to be limited to the details herein set forth, but the invention is of the full scope of the appended claims.

We claim:

1. In a locking system for a selective denomination registering machine, a denomination selector means, a control register operable for registering the selected denomination each time the machine is operated, a locking means operatively responsive to the control register for locking the machine against further use when the amount registered in the register passes a predetermined value, and a release means operatively associated with the selector for unlocking the locking means when the selector has been actuated to reduce to a predetermined lesser amount the maximum denomination which may be selected for registering during a single operation of the machine.

2. In a progressive locking system for a selective denomination registering machine, a denomination selector means, a control register operable for registering the selected denomination each time the machine is operated, a first locking means operatively responsive to the control register for locking the machine against further use when the amount registered in the register passes a predetermined value, a release means operatively associated with the selector for unlocking the first locking means when the selector has been actuated to reduce to a predetermined lesser amount the maximum denomination which may be selected for registering during a single operation of the machine, and a final locking means operatively responsive to the control register for finally locking the machine when the amount registered in the register passes a second predetermined value.

3. In a locking system for a selective denomination registering machine, a denomination selector means, a control register operable for registering the selected denomination each time the machine is operated, a first locking means operatively responsive to the control register for locking the machine against further use when the amount registered in the register passes a predetermined value, a release means operatively associated with the selector for unlocking the locking means when the selector has been actuated to reduce to a predetermined lesser amount the maximum denomination which may be selected for registering during a single operation of the machine, and means for rendering the selector inoperative to register a higher denomination than the said predetermined lesser amount to or below which said selector is actuated to operate the release means.

4. In a progressive locking system for a selective denomination registering machine, a denomination selector means, a control register operable for registering the selected denomination each time the machine is operated, a first locking means operatively responsive to the control register for locking the machine against further use when the amount registered in the register passes a predetermined value, a release means operatively associated with the selector for unlocking the first locking means when the selector has been actuated to reduce to a predetermined lesser amount the maximum denomination which may be selected for registration during a single operation of the machine, means for rendering the selector inoperative to register a higher denomination than the said predetermined lesser amount to or below which said selector is actuated to operate the release means, and a final locking means operatively responsive to the control register for finally locking the machine when the amount registered in the register passes a second predetermined value.

5. In a locking system for a selective denomination registering machine, a control register operable for registering the selected denomination each time the machine is operated, a locking means operatively associated with the control register for locking the machine against further use when the amount registered in the register coincides with or falls below the maximum denomination which may be registered during a single operation of the machine, and a release means operatively associated with the locking means for unlocking the same when the maximum denomination which may be selected for registration during a single operation of the machine has been reduced to a predetermined lesser amount.

6. In a progressive locking system for a selective denomination registering machine, a control register operable for registering the selected denomination each time the machine is operated, a first locking means operatively associated with the control register for locking the machine against further use when the amount registered in the register coincides with or falls below the maximum denomination which may be registered during a single operation of the machine, a release means operatively associated with the locking means for unlocking the same when the maximum denomination which may be selected for registration during a single operation of the machine has been reduced to a predetermined lesser amount, and a final locking means operatively responsive to the control register for finally locking the machine against further use when the amount registered in the register coincides with or falls below said predetermined lesser amount.

7. In a progressive locking system for a selective denomination registering machine, a denomination selector means, a control register operable for registering the selected denomination each time the machine is operated, a first locking means operatively responsive to the control register for locking the machine against further use when the amount registered in the register coincides with or falls below the maximum denomination which may be registered during a single operation of the machine, a release means operatively associated with the selector for unlocking the first locking means when the selector has been actuated to reduce to a predetermined lesser amount the maximum denomination which may be selected for registration during a single operation of the machine, means for rendering the selector inoperative to register a higher denomination than the said predetermined lesser amount to or below which the selector is actuated to operate the release means, and a final locking means operatively responsive to the control register for finally locking the machine when the amount registered in the register coincides with or falls below a second predetermined amount.

8. In a locking system for a selective denomination registering machine, a denomination selector means operable for setting up a selected denomination for registration, means actuated during the operating cycle of the machine for rendering the selector means inoperative to change the selected value, a control register for registering the selected denomination each time the machine is operated, a first locking mechanism operatively responsive to the control register for locking the machine against further use when the amount registered in the register passes a predetermined value, a release means operatively associated with the selector for unlocking the locking mechanism when the selector has been actuated to reduce to a predetermined lesser amount the maximum denomination which may be selected for registration during a single operation of the machine, and a second locking mechanism being operable for finally locking the machine when the amount registered in the register passes a second predetermined value.

9. In a control system for a selective denomination registering machine, a drive mechanism for the machine, a clutch means operatively included therein, a trip mechanism operable for releasing the clutch means to actuate the machine, a control register for registering the selected denomination each time the machine is operated, a control mechanism operatively responsive to the control register for rendering the trip mechanism inoperative to release the clutch when the amount registered in the register passes a predetermined value, and a release means operatively associated with the control mechanism for releasing the trip mechanism when the maximum denomination which may be selected for registration during a single operation of the machine has been reduced to a predetermined lesser amount.

10. In a progressive locking means for a selective denomination registering machine, a drive mechanism for the machine, a clutch means operatively included therein, a trip mechanism operable for releasing the clutch to actuate the machine, a control register for registering the selected denomination each time the machine is operated, a first locking mechanism operatively responsive to the control register for rendering the trip mechanism inoperative to release the clutch when the amount registered in the register passes a predetermined value, a release means operatively associated with the first locking mechanism for releasing the trip mechanism when the maximum denomination which may be selected for registration during a single operation of the machine has been reduced to a predetermined lesser amount, and a second locking mechanism being operable for rendering the trip finally inoperative when the amount registered in the register passes a final predetermined value.

11. In a progressive locking system for a selective denomination registering machine, a drive mechanism for the machine, a clutch means operatively included therein, a trip mechanism operable for releasing the clutch to actuate the machine, a denomination selector means, a control register for registering the selected denomination each time the machine is operated, a control mechanism operatively responsive to the control register for rendering the trip mechanism inoperative to release the clutch when the amount registered in the register passes a predetermined value, a release means operable upon the actuation of the selector to reduce to a predetermined lesser amount the maximum denomination which may be registered during a single operation of the machine for releasing the trip mechanism after this mechanism has been rendered inoperative by the control mechanism, and means for rendering the selector inoperative to set up for registration a higher denomination than the said predetermined lesser amount to or below which said selector is actuated to operate the release means.

12. In a progressive locking system for a selective denomination registering machine, a drive mechanism for the machine, a clutch means operatively included therein, a denomination selector means, a control register for registering the selected denomination each time the machine is operated, a first locking mechanism operatively responsive to the control register for rendering the clutch inoperative to actuate the machine when the amount registered in the register passes a predetermined value, a release means operable upon the actuation of the selector to reduce to a predetermined lesser amount the maximum denomination which may be registered during a single operation of the machine for releasing the first locking mechanism to free the clutch after this mechanism has actuated to render the clutch inoperative, means for rendering the selector inoperative to set up for registration a higher denomination than the said predetermined lesser amount to or below which said selector is actuated to operate the release means, and a second locking mechanism being operable for rendering the clutch means finally inoperative when the amount registered in the register passes a final predetermined value.

13. In a progressive control system for a selective denomination registering machine, a drive mechanism for the machine, a clutch means operatively included therein, a denomination selector means, a control register for registering the selected denomination each time the machine is operated, a first locking mechanism operatively responsive to the control register for rendering the clutch inoperative to actuate the machine when the value registered in the register coincides with or falls below the maximum denomination which may be registered during a single operation of the machine, a release means operable upon the actuation of the selector to reduce to a predetermined lesser amount the maximum denomination which may be registered during a single operation of the machine for releasing the first locking mechanism to free the clutch after this mechanism has actuated to render the clutch inoperative, and a second locking mechanism being operable for rendering the clutch means finally inoperative when the value registered in the register coincides with or falls below said predetermined lesser amount.

14. In a control system for a selective denomination registering machine, a drive mechanism, a clutch means operatively included therein, a denomination selector, a control register for registering the selected denomination each time the machine is operated, a control mechanism operatively responsive to the control register for both locking the machine against further use and rendering the clutch means inoperative to actuate the machine when the amount registered in the register passes a predetermined value, and a release means operable upon the actuation of the selector to reduce to a predetermined lesser amount the maximum denomination which may be registered during a single operation of the machine for actuating the control mechanism to unlock the machine and free the clutch means.

15. In a control system for a selective denomination registering machine, a drive mechanism, a clutch means operatively included therein, a denomination selector, a control register for registering the selected denomination each time the machine is operated, a first locking mechanism operatively responsive to the control register for both locking the machine against further use and rendering the clutch means inoperative to actuate the machine when the amount registered in the register passes a predetermined value, a release means operable upon the actuation of the selector to reduce to a predetermined lesser amount the maximum denomination which may be registered during a single operation of the machine for actuating the first locking mechanism to unlock the machine and to free the clutch means, and a second locking mechanism being operative to both finally lock the machine and render the clutch means inoperative when the amount registered in the register passes a second predetermined value.

16. In a selective denomination registering machine, a reciprocatory control register operatively mounted in the machine, a plurality of registering wheels operatively mounted therein, a detector means operatively mounted in the control register and operable for releasing the locking mechanism of the machine when the amount registered in the register passes a predetermined value, a stationary cam means mounted upon the machine frame, and said detector having means operable for engaging said cam to withdraw the detector from engagement with the registering wheels while the registering wheels are turning to register a selected denomination and thereafter for releasing the detector to detect whether or not the registering wheels have turned past the predetermined value.

17. In a selective denomination registering machine, a control register reciprocally and swingably mounted in the machine, a plurality of registering wheels operatively mounted in the register, denomination selector means selectively positionable in the path of travel of the control register when swung in one plane while traveling through the first stroke of the reciprocatory motion thereof to turn the registering wheels an amount equivalent to the value of the selected denomination, transfer mechanism operable during the second stroke of the register while swung in a second plane for advancing the registering wheels of higher order one unit when the registering wheels of lower order have advanced ten units, a detector means engageable with the registering wheels of higher order than those engageable with the selector means, a cam means mounted upon the machine frame, said detector having means engageable with said cam during the second stroke of the register to withdraw the detector from engagement with the registering wheels while these registering wheels are being turned by the transfer mechanism and thereafter for releasing the detector means to detect whether or not the registering wheels have turned past a predetermined value, and a locking mechanism operatively responsive to the detector means for locking the machine against further use when said means detect that the amount registered in the register has passed the predetermined value.

JOHN Q. FINFROCK.
FRANK P. SAGER.